US009764354B2

(12) United States Patent
Gillanders et al.

(10) Patent No.: US 9,764,354 B2
(45) Date of Patent: *Sep. 19, 2017

(54) PROCESS FOR COATING THE INTERIOR SURFACE OF UNDERGROUND PIPES

(71) Applicant: Pipe Restoration Technologies, LLC, Las Vegas, NC (US)

(72) Inventors: Larry L. Gillanders, Chilliwack (CA); Steven A. Wiiliams, Stockton, CA (US)

(73) Assignee: Pipe Restoration Technologies, LLC, Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 15/449,454

(22) Filed: Mar. 3, 2017

(65) Prior Publication Data
US 2017/0175944 A1  Jun. 22, 2017

Related U.S. Application Data

(60) Division of application No. 14/829,248, filed on Aug. 18, 2015, now Pat. No. 9,611,973, which is a division of application No. 14/011,260, filed on Aug. 27, 2013, now Pat. No. 9,273,815, which is a division of application No. 13/566,377, filed on Aug. 3, 2012, now Pat. No. 8,524,320, said application No. 14/829,248 is a continuation-in-part of application No. 13/210,659, filed on Aug. 16, 2011, now Pat. No. 8,887,660, which is a division of application No. 12/947,012, filed on Nov. 16, 2010, now Pat. No. 8,354,140, which is a division of application No. 12/378,670, filed on Feb. 18, 2009, now Pat. No. 8,206,783, which is a division of application No. 11/246,825, filed on Oct. 7, 2005, now Pat. No. 7,517,409, which is a division of application No. 10/649,288, filed on Aug. 27, 2003, now Pat. No. 7,160,574, said application No. 14/829,248 is a continuation-in-part of application No. 12/813,873, filed on Jun. 11, 2010, now Pat. No. 8,343,579, and a division of application No. 12/723,115, filed on Mar. 12, 2010, now Pat. No. 8,033,242, which is a division of application No. 11/649,647, filed on Jan. 4, 2007, now Pat. No. 7,858,149, which is a continuation-in-part of application No. 11/246,825, which is a division of application No. 10/649,288.

(60) Provisional application No. 61/595,794, filed on Feb. 7, 2012, provisional application No. 60/406,602, filed on Aug. 28, 2002.

(51) Int. Cl.
B05D 7/22 (2006.01)
F16L 57/00 (2006.01)
F16L 58/02 (2006.01)
F16L 58/10 (2006.01)
B05D 3/00 (2006.01)
B05D 3/04 (2006.01)
B05D 3/12 (2006.01)

(52) U.S. Cl.
CPC ............. B05D 7/222 (2013.01); B05D 3/002 (2013.01); B05D 3/007 (2013.01); B05D 3/0406 (2013.01); B05D 3/0473 (2013.01); B05D 3/12 (2013.01); F16L 57/00 (2013.01); F16L 58/02 (2013.01); F16L 58/1009 (2013.01); B05D 2254/04 (2013.01)

(58) Field of Classification Search
CPC ....... F16L 58/1009; F16L 57/00; F16L 58/02; B05D 3/002; B05D 3/007; B05D 3/12; B05D 7/222
USPC .......................... 427/230–239, 299, 327, 410
See application file for complete search history.

(56) References Cited

U.S. PATENT DOCUMENTS

| 1,890,164 A | 12/1932 | Rosenberger |
| 2,087,694 A | 7/1937 | Malmros |
| 2,298,775 A | 10/1942 | Raiche |
| 2,331,824 A | 10/1943 | Buckingham |
| 2,497,021 A | 2/1950 | Sterns |
| 3,139,704 A | 7/1964 | McCune |

(Continued)

FOREIGN PATENT DOCUMENTS

| CA | 2198103 | 3/1996 |
| DE | 3821558 | 12/1989 |

(Continued)

OTHER PUBLICATIONS

U.S. Army Corps of Engineers, In Situ Epoxy Coating for Metallic Pipe Guidance, Public Works Technical Bulletin 420-49-35, 2001, U.S. Army Corps of Engineers, Washington, D.C., 32 pages.

(Continued)

*Primary Examiner* — William Phillip Fletcher, III
(74) *Attorney, Agent, or Firm* — Brian S. Steinberger; Law Offices of Brian S. Steinberger, P.A.

(57) ABSTRACT

Methods, processes, compositions and systems for preventing leaching effects from water pipes (such as lead, steel and copper) having an inner diameter of at least approximately 12 mm. 2-part thermoset resin coating is applied to the inner surfaces of the pipes where the curing agent can be a phenol free and plasticizer free adduct type. The coating can reduce heavy metals, such as lead, from leaching from installed pipes to less than approximately 10 μg/L (10 ppb). When cured, specific leachates, Bisphenol A and Epichlorohydrin from the coatings will be (less than) <1 μg/L (1 ppb) with overall TOC levels measured at (less than) <2.5 mg/L (2.5 ppm). Pipes can be returned to service within approximately 24 hours, and preferably within approximately 4 hours.

20 Claims, 8 Drawing Sheets

(56) References Cited

U.S. PATENT DOCUMENTS

| | | | |
|---|---|---|---|
| 3,139,711 | A | 7/1964 | Soderberg, Jr. |
| 3,151,418 | A | 10/1964 | Powell et al. |
| 3,286,406 | A | 11/1966 | Ashworth |
| 3,287,148 | A | 11/1966 | Hilbush, Jr. |
| 3,382,892 | A | 5/1968 | Cerbin |
| 3,385,587 | A | 5/1968 | Smith |
| 3,440,400 | A | 4/1969 | Cotts |
| 3,485,671 | A | 12/1969 | Stephens |
| 3,608,249 | A | 9/1971 | Sullivan |
| 3,727,412 | A | 4/1973 | Marx et al. |
| 3,835,587 | A | 9/1974 | Hall, Jr. |
| 3,925,576 | A | 12/1975 | Hendrix |
| 4,005,549 | A | 2/1977 | Perry |
| 4,117,308 | A | 9/1978 | Boggs et al. |
| 4,177,308 | A | 12/1979 | Beeler |
| 4,246,148 | A | 1/1981 | Shimp et al. |
| 4,255,468 | A | 3/1981 | Olson |
| 4,311,409 | A | 1/1982 | Stang |
| 4,314,427 | A | 2/1982 | Stoltz |
| 4,327,132 | A | 4/1982 | Shinno |
| 4,333,277 | A | 6/1982 | Tasedan |
| 4,454,173 | A | 6/1984 | Koga |
| 4,454,174 | A | 6/1984 | Koga |
| 4,505,613 | A | 3/1985 | Koga |
| 4,576,596 | A | 3/1986 | Jackson et al. |
| 4,579,596 | A | 4/1986 | Murzyn |
| 5,007,461 | A | 4/1991 | Naf |
| 5,017,258 | A | 5/1991 | Brown et al. |
| 5,045,352 | A | 9/1991 | Mueller |
| 5,046,289 | A | 9/1991 | Bengel et al. |
| 5,085,016 | A | 2/1992 | Rose |
| 5,192,816 | A | 3/1993 | Iizuka |
| 5,231,804 | A | 8/1993 | Abbott |
| 5,460,563 | A | 10/1995 | McQueen, Jr. |
| 5,499,659 | A | 3/1996 | Naf |
| 5,544,859 | A | 8/1996 | Coltrinari et al. |
| 5,622,209 | A | 4/1997 | Naf |
| 5,643,057 | A | 7/1997 | Isaacson |
| 5,707,702 | A | 1/1998 | Brady, Jr. et al. |
| 5,800,629 | A | 9/1998 | Ludwig et al. |
| 5,915,395 | A | 6/1999 | Smith |
| 5,924,913 | A | 7/1999 | Reimelt |
| 5,936,022 | A | 8/1999 | Freeman |
| 5,950,681 | A | 9/1999 | Reimelt |
| 6,316,016 | B1 | 11/2001 | Iwakawa |
| 6,345,632 | B1 | 2/2002 | Ludwig et al. |
| 6,397,895 | B1 | 6/2002 | Lively |
| 6,423,152 | B1 | 7/2002 | Landaas |
| 6,739,950 | B1 | 5/2004 | Kruse |
| 7,041,176 | B2 | 5/2006 | Kruse |
| 7,066,730 | B2 | 6/2006 | Macaluso |
| 7,160,574 | B1 | 1/2007 | Gillanders et al. |
| 7,270,847 | B2 | 9/2007 | Horn |
| 7,517,409 | B1 | 4/2009 | Gillanders et al. |
| 7,605,195 | B1 | 10/2009 | Ward et al. |
| 7,771,542 | B1 | 8/2010 | Hunt et al. |
| 7,858,149 | B2 | 12/2010 | Gillanders et al. |
| 8,343,579 | B2 | 1/2013 | Gillanders |
| 8,524,320 | B1 * | 9/2013 | Gillanders .............. C23C 26/00 427/239 |
| 8,696,823 | B1 | 4/2014 | Gillanders |
| 8,795,768 | B2 | 8/2014 | Gillanders |
| 9,273,815 | B2 * | 3/2016 | Gillanders .............. C23C 26/00 |
| 9,611,973 | B2 * | 4/2017 | Gillanders .......... F16L 58/1009 |
| 2004/0132387 | A1 | 7/2004 | Kruse |
| 2004/0163684 | A1 | 8/2004 | Hapke |
| 2007/0128353 | A1 | 6/2007 | Gillanders et al. |
| 2010/0047439 | A1 | 2/2010 | Gillanders et al. |

FOREIGN PATENT DOCUMENTS

| | | |
|---|---|---|
| DE | 4404473 | 9/1995 |
| EP | 0299134 | 2/1988 |
| EP | 0393433 | 4/1990 |
| EP | 0551790 | 7/1993 |
| EP | 0634229 | 7/1994 |
| EP | 0637737 | 7/1994 |
| EP | 1674495 | 6/2006 |
| EP | 07716240.2 | 7/2009 |
| EP | 07716240 | 6/2011 |
| GB | 2140377 | 11/1984 |
| JP | 5822662 | 2/1983 |
| JP | 06126245 | 5/1994 |
| JP | 3737569 | 2/1998 |
| RU | 116040 | 2/1959 |
| WO | 2008088317 | 7/2008 |
| WO | PCT/US07/000072 | 8/2008 |
| WO | 2009014760 | 1/2009 |
| WO | 2011040899 | 4/2011 |

OTHER PUBLICATIONS

Boyd et. al., Lead Pipe Rehabilitation and Replacement Techniques for Drinking Water Service: Review of Available and Emerging Technologies, Trenchless Tech, 2001, pp. 13-24, vol. 15, No. 1, 12 pages.
Brady, Licensing Agreement between American Pipe Lining, Inc. and U.S. Navy, Aug. 1996, 19 pages.
ABSS Visual Comparator Guide Degrees of Cleanliness, Sep. 9, 2013, 1 page.
Patentees response to Reexam U.S. Appl. No. 95/001,717, filed Feb. 2, 2012, 79 pages.
3rd party requesters response to Reexam U.S. Appl. No. 95/001,717, filed Sep. 13, 2011, 56 pages.
Interparty Reexam, U.S. Appl. No. 95/001,717, filed Aug. 17, 2011, 137 pages.
American Pipe Lining, Inc., In-Place Pipe Restoration, 2001, 11 pgs, online, retrieved on Oct. 25, 2005, retrieved from http://web.archive.org/web20010801213356/www.ampipelining.com/index.html, 12 pages.
ACE DuraFlo—The Modern Pipe Renovation System, 2001, online, retrieved on Oct. 20, 2005, retrieved from http://web.archive.org/web/2011021003415/http://aceduraflo.com/index.html, 13 pages.
ACE DuraFlo Dust Collector Service Manual, ACE DuraFlo Systems, LLC, 2001, Manual, 6 pages.
Brady, Fact Sheet from the Navy Pollution Prevention Conference on the Restoration of Drinking Water Piping with Nontoxic Epoxy Linings, 1995, Navy Pollution Prevention Conference, Arlington, VA, EnviroSense, 4 pages.
Brady, et. al., Epoxy Lining for Shipboard Piping Systems, Materials Chemistry Branch, Chemistry Division, NRL/MR/6120-94-7629, 1994, 29 pages.
Demboski, et. al., Evolutions in U.S. Navy Shipboard Sewage and Graywater Programs, retrieved on Sep. 3, 2014, 16 pages.
Gillanders, U.S. PCT Patent Application No. PCT/US09/05514 filed Oct. 7, 2009, International Search Report dated Apr. 13, 2010, 4 pages.
Reexamination Request for U.S. Pat. No. 7,160,574 filed Jun. 14, 2015, 11 pages.
Reexamination Request for U.S. Pat. No. 7,160,574 filed Jul. 6, 2015, 90 pages.
Hei, Asaki, Toyo Lining Report Technical Evaluations, Jul. 16, 1981, 57 pages.
Brady, Robert F., Jr., Restoration of Drinking Water Piping With Nontoxic Epoxy Linings, published on Proceedings of the Tree-Service Environment Technology Workshop, "Enhancing Readiness Through Environmental Quality Technology" held in Hershey, PA on the May 20-22, 1996, 6 pages.
Brady, Robert F., Jr., Control of Lead in Drinking Water, Jul. 11, 1997, Naval Research Laboratory, 113 pages.
Information Disclosure Statement (IDS) for Reexamination Request for U.S. Pat. No. 7,160,574 filed Jul. 6, 2015, 2 pages.
Second Reexamination Request for U.S. Pat. No. 8,344,579 filed Jul. 10, 2015, 384 pages.
Gillanders, Appeal No. 2014-001128, Re-Exam U.S. Appl. No. 95/001,717, Re-Exam Filing Date Sep. 13, 2011, U.S. Pat. No.

(56) References Cited

OTHER PUBLICATIONS 7,858,149, Patent Owner's Request to Reopen Prosecution Pursuant to 37 C.F.R. 41 77 (b) (1) Filed Feb. 17, 2015, 49 pages.
Gillanders, Re-Exam U.S. Appl. No. 95/001,717, Re-Exam filing date Sep. 13, 2011, U.S. Pat. No. 7,858,149, Information Disclosure Statement by Applicant (Not for Submission under 37 CFR 1.99) filed Feb. 17, 2015, 4 pages.
Gillanders, U.S. Appl. No. 60/406,602, filed Aug. 28, 2002, 40 pages.
Gillanders, U.S. Appl. No. 13/676,784, filed Nov. 14, 2012, Amendment Response filed with PTO on Apr. 25, 2014, 13 pages.
ASTM International, Designation: D4541-02, Standard Test Method for Pull-Off Strength of Coatings Using Portable Adhesion Testers, 2014, 13 pages.
Gillanders, Re-Exam U.S. Appl. No. 95/001,717, Re-Exam Filing Date Sep. 13, 2011, U.S. Pat. No. 7,858,149, Electronic Acknowledgment Receipt, Feb. 17, 2015, 2 pages.
Gillanders, Re-Exam U.S. Appl. No. 95/001,717, Re-Exam Filing Date Sep. 13, 2011, U.S. Pat. No. 7,858,149, Decision on Request for Hearing mailed Jan. 16, 2015, 9 pages.
Gillanders, Re-Exam U.S. Appl. No. 90/013,429, Re-Exam Filing Date Jan. 19, 2015, U.S. Pat. No. 8,343,579, Request for Ex Parte Reexamination dated Feb. 27, 2015, 15 pages.
Gillanders, Re-Exam U.S. Appl. No. 90/013,429, Re-Exam Filing Date Jan. 19, 2015, U.S. Pat. No. 8,343,579, 37 CFD 1.501 Information Disclosure Citation in a Patent, mailed Feb. 25, 2015, 2 pages.
Scotchkote 134 Fusion Bonded Epoxy Coating, Information, Properties and Test Results, 3M Corrosion Protection Products, 2000, 14 pages.
Vista Irrigation District Standard Specifications, Section 04100—Fusion-Bonded Epoxy Linings and Coatings, Vista Irrigation District (Rev. 3/99), 7 pages.
Mark Schilling, Coating Adhesion Testing in Accordance with ASTM D4541—Sticky Business, Apr. 2004, 2 pages.
Gillanders, et. al., Methods and Systems for Coating and Sealing Inside Piping Systems, Utility U.S. Appl. No. 14/485,177, filed Sep. 12, 2014 (Divisional of '579 Patent in Reexam), Information Disclosure Statement (IDS) filed with PTO on May 20, 2015, "All References Considered Expect Where Lined Through", 4 pages.
Order Denying Defendants' Motion for Partial Summary Judgment of Invalidity and Granting in Part Plaintiff's Motion for Summary Judgment of Validity, United States District Court Central District of California Southern Division, *Pipe Restoration Technologies, LLC, et al.* v. *Pipeline Restoration Plumbing, Inc. et al.*, Case No. SACV 1300499-CJC (RNBx), Jul. 8, 2014, 10 pages.
"Your Home's Plumbing System", by Tim Oglesby (Home Check America). This document is accessible at web.archive.org website at (version of 22.12.2005): http://web.archive.Org/web/20051222132445/http://media.reliancenetwork.com/media/downloads/RemaxIL/200565101848.pdf. 8 pages.
"Water Pipeline Design Guidelines", published by Saskatchewan Environment (dated Apr. 2004). This document is accessible at web.archive.org website at (version of 11.03.2012): https://web.archive.Org/web/20120311170322/http://www.saskh2o.ca/DWBinder/EPB276WaterPipelineDesignGuidelines.pdf. 13 pages.
"High water pressure fact sheet", published by City of Olympia (Capital of Washington State). This document is accessible at web.archive.org website at (version of 12.11.2012): https://web.archive.Org/web/20121102104045/http://olympiawa.gov/city"utilities/drinking-water/conservation/~/media/Files/PublicWorks/WaterResources/PRV%20Flyer_2012.pdf. 2 pages.
"Water Pressure: What Causes It?", published by Columbus Water Works. This document is accessible at web.archive.org website at (version of 28.03.2014): https://web.archive.Org/web/20140328093048/https://www.cwwga.org/documentlibrary/180_BILLSTUFFER%20-%20APRIL%202011%20-%20WATER%20PRESSURE.pdf. 2 pages.
"Codigo Tecnico de la Edification: Salubridad", published by the Spanish Ministry of Public Works and Transportation (document in Spanish). The norms included in this document are of general application in Spain. This document is accessible at web.archive.org website at (version of 09.04.2011): https://web.archive.Org/web/20110409122148/http://www.codigotecnico.org/cte/export/sites/default/web/galerias/archivos/DB_HS_2009.pdf. 135 pages.
"Pressure Pipe System Ratings", published by Polypipe. This document is accessible at web.archive.org website at (version of 28.03.2014): https://web.archive.Org/web/20140328093900/http://www.polypipe.com/cms/toolbox/Terrain_Pressure_HPPE_Pipe_System_Ratings.pdf. 5 pages.
"Ezeeflow Technical Manual", published by Ezeeflow. This document is accessible at web.archive.org website at (version of 07.09.2012): https://web.archive.Org/web/20120907105306/http://www.globalhardwaregy.com/wp-upload/2011/06/Ezeeflow_Catalog_.pdf. 25 pages.
Gillanders, U.S. Appl. No. 12/881,328, filed Sep. 14, 2010. Office Action Summary received from the U.S. Patent Office, dated Nov. 19, 2013, 10 pages.
Gillanders, U.S. Appl. No. 11/946,107, filed Nov. 28, 2007, Notice of Allowance received from the U.S. Patent Office, dated Feb. 27, 2014, 9 pages.
A-S Method, We are a person you are looking for A-S Method Pipe Rehabilitation System, Toyo Lining Co., Ltd., 1981, pp. 00789-00807, 19 pages.
Gillanders, European Patent Application 15178498.0-1754 filed Jul. 27, 2015, Extended European Search Report dated Nov. 27, 2015, 11 pages.
Gillanders, European Patent Application 12747878.2-1301 filed Aug. 10, 2012, Extended Supplementary European Search Report dated Dec. 23, 2015, 14 pages.
NSF/ANSI 61-2002e, Section 5. Barrier Materials, 2002, 8 pages.
ANSI/AWWA C210-97, AWWA Standard for Liquid-Epoxy Coating Systems for the Interior and Exterior of Steel Water Pipelines, 1997, 24 pages.
Gillanders, U.S. Reexamination Application No. 90/013,429 filed Jul. 23, 2015 for Reexamination of U.S. Pat. No. 8,343,579 merged with Gillanders, U.S. Reexamination Application No. 90/013,548 filed Jul. 23, 2015 for Reexamination of U.S. Pat. No. 8,343,579 Official Action from PTO dated Nov. 23, 2015, 6 pages.
Gillanders, U.S. Reexamination Application No. 90/013,528, filed on Jul. 6, 2015 for Reexamination of U.S. Pat. No. 7,160,574 Patent Owner's Response to PTO Office Action; Response dated Feb. 9, 2016, 35 pages.
Gillanders, U.S. Reexamination Application No. 90/013,528 filed Jul. 6, 2015 for Reexamination U.S. Pat. No. 7,160,574, Official Action from PTO dated Apr. 1, 2016, 53 pages.
SSPC—The Society for Protective Coatings and NACE International Standard, Joint Surface Preparation Standard, SSPC-SP 5/NACE NO, 1 White Metal Blast Cleaning, copyrighted SSPC: The Society for Protective Coatings, Pittsburg, PA. Sep. 1, 2000, pp. 55-59, 5 pages.
Gillanders, L., U.S. Appl. No. 13/676,784, filed Nov. 14, 2012, Response filed to U.S. Patent Office on Mar. 7, 2014, 41 pages.
Gillanders, L., U.S. Appl. No. 13/676,784, filed Nov. 14, 2012, Notice of Allowance received from the U.S. Patent Office dated Mar. 27, 2014, 13 pages.
Gillanders, L., U.S. Appl. No. 13/676,784, filed Nov. 14, 2012. Response filed to U.S. Patent Office on Apr. 1, 2014, 80 pages.
Gillanders, L., U.S. Appl. No. 13/676,784, filed Nov. 14, 2012, Office Action Summary received from the U.S. Patent Office dated Apr. 9, 2014, 11 pages.
ACE DuraFlo—The Modern Pipe Renovation System, 2001, online, retrieved on Oct. 20, 2005, retrieved from Http://web.archive,org/web/2011021003415/http://aceduraflo.com/index.html, 13 pages.
ACE Duraflo—The Modern Pipe Renovation System, 2001, online, retrieved on Oct. 20, 2005, retrieved from http://web.archive.org/web/2011129000953/http://aceduraflo.com/index.html, 11 pages.
ACE Duraflo—The Modern Pipe Renovation System, 2001, online, retrieved on Oct. 20, 2005, retrieved from http://web.archive.org/web/20011210171031/http://aceduraflo.com/index.html, 13 pages.

(56) References Cited

OTHER PUBLICATIONS

ACE Duraflo—The Modern Pipe Renovation System, 2001, 11 pgs., online, retrieved on Oct. 20, 2005, retrieved from http://www.aceduraflo.com/index.html.
American Pipe Lining, Inc., In-Place Pipe Restoration, date unknown, brochure, 9 pages.
NICITCP Session I Student Handbook, Abrasive Blast Cleaning, Mar. 1992, 6 pages.
Guan, S., PhD and Kennedy H, B. Sc., MBA. A Performance Evaluation of Internal Linings of Municipal Pipe, 1996 North American Corrosion Engineers, Denver, Colorado, 14 pages.
McGovern, M., Can Coatings Protect Wastewaster Treatment Systems? County Sanitation Districts of Los Angeles County tests the sulfuric-acid resistance of 78 products, The Aberdeen Group, 1999, 3 pages.
Warren IC. In Situ Epoxy Resin Lining—Operational Guidelines and Code of Practice. Water Research Centre (WRc), Swindon, UK 1989, 5 pages.
Deb, et al. Service Life Analysis of Water Main Epoxy Lining, AwwaRF, USA, 2006, 18 pages.
Redner, et al., Evaluation of Protective Coatings for Concrete. County Sanitation Districts of Los Angeles, Whittier California, Aug. 1998, 36 pages.
AWWA, American Water Works Assocation. C210-03 Liquid Epoxy Coating Systems for the Interior and Exterior of Steel Water Pipelines, Jun. 1, 2004, Denver, Colorado, 28 pages.

\* cited by examiner

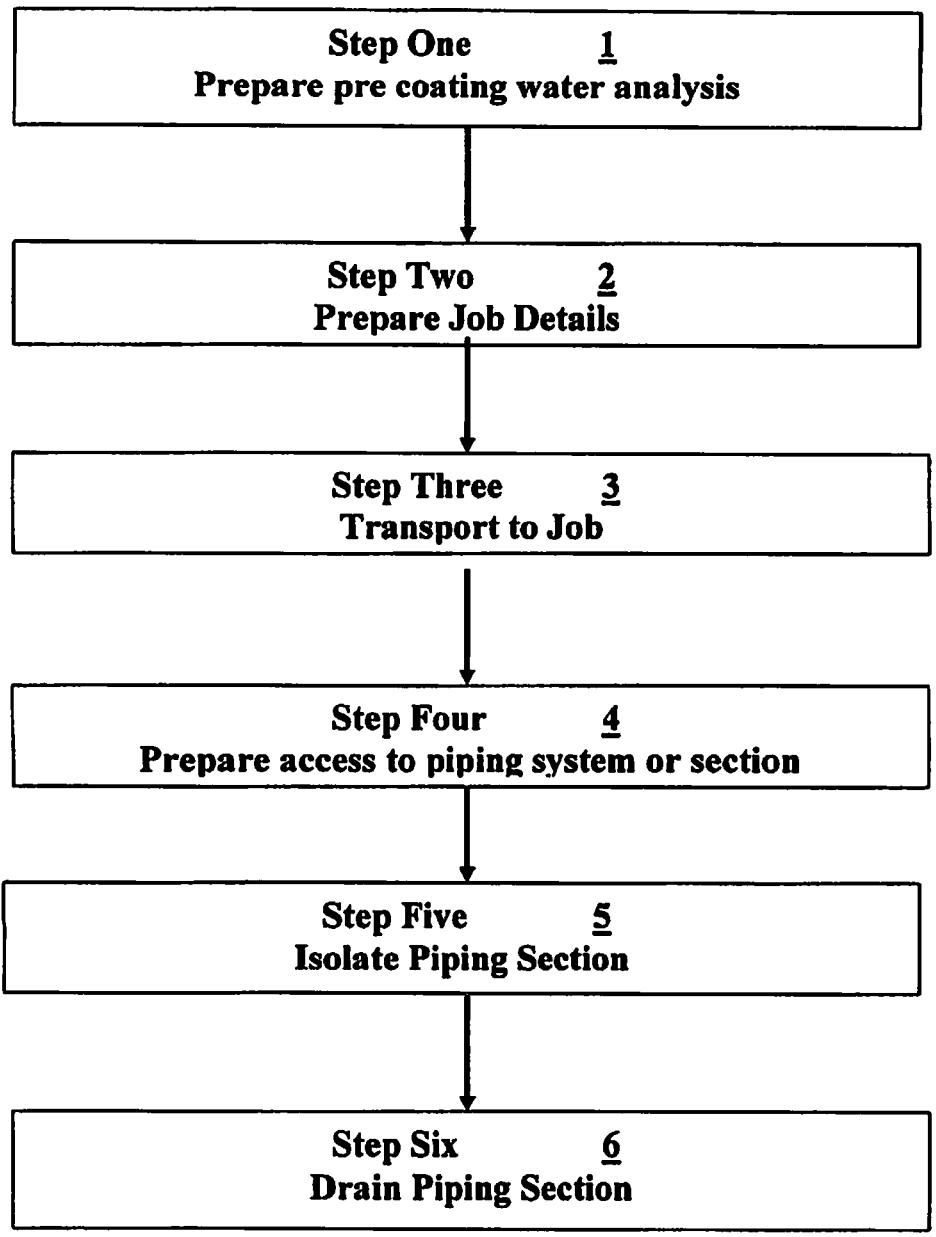

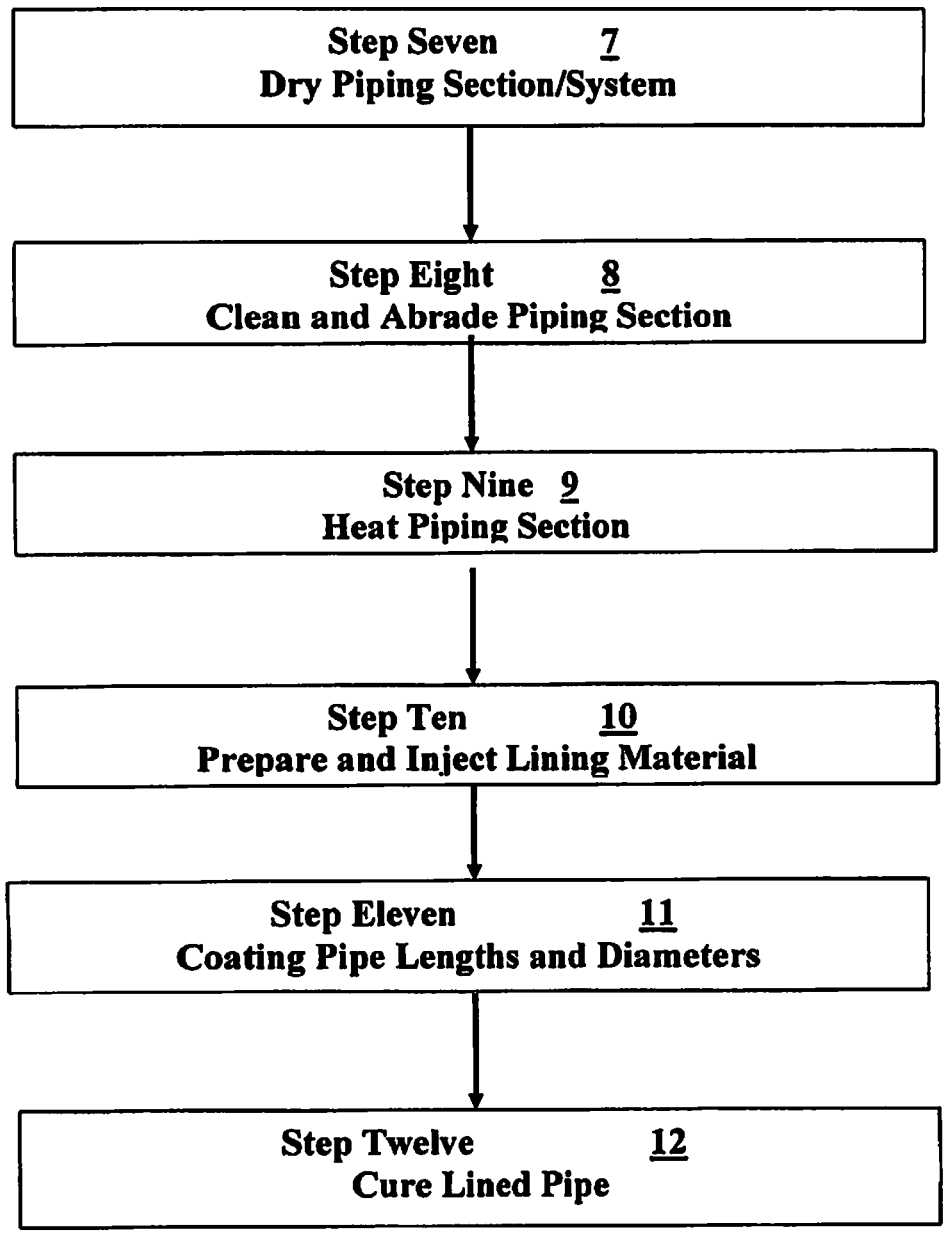

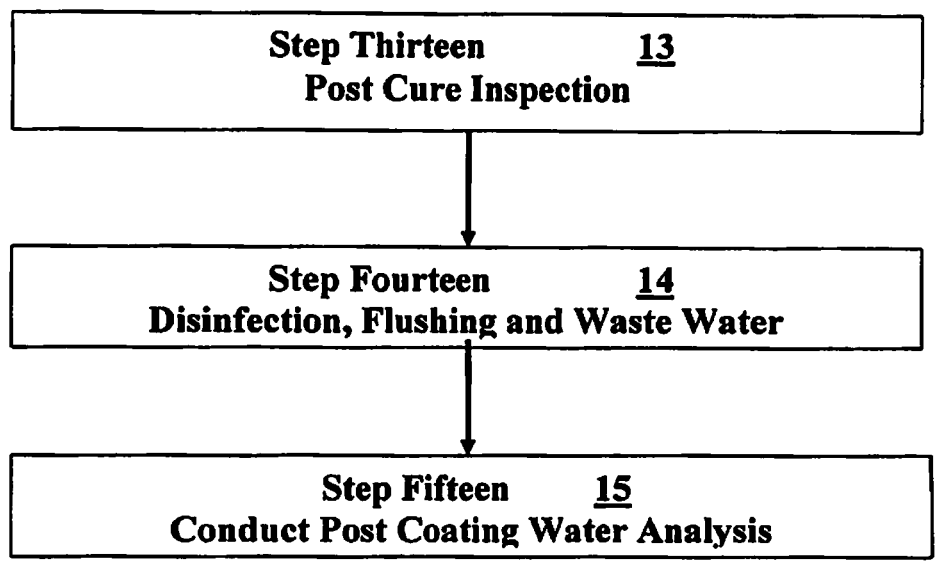

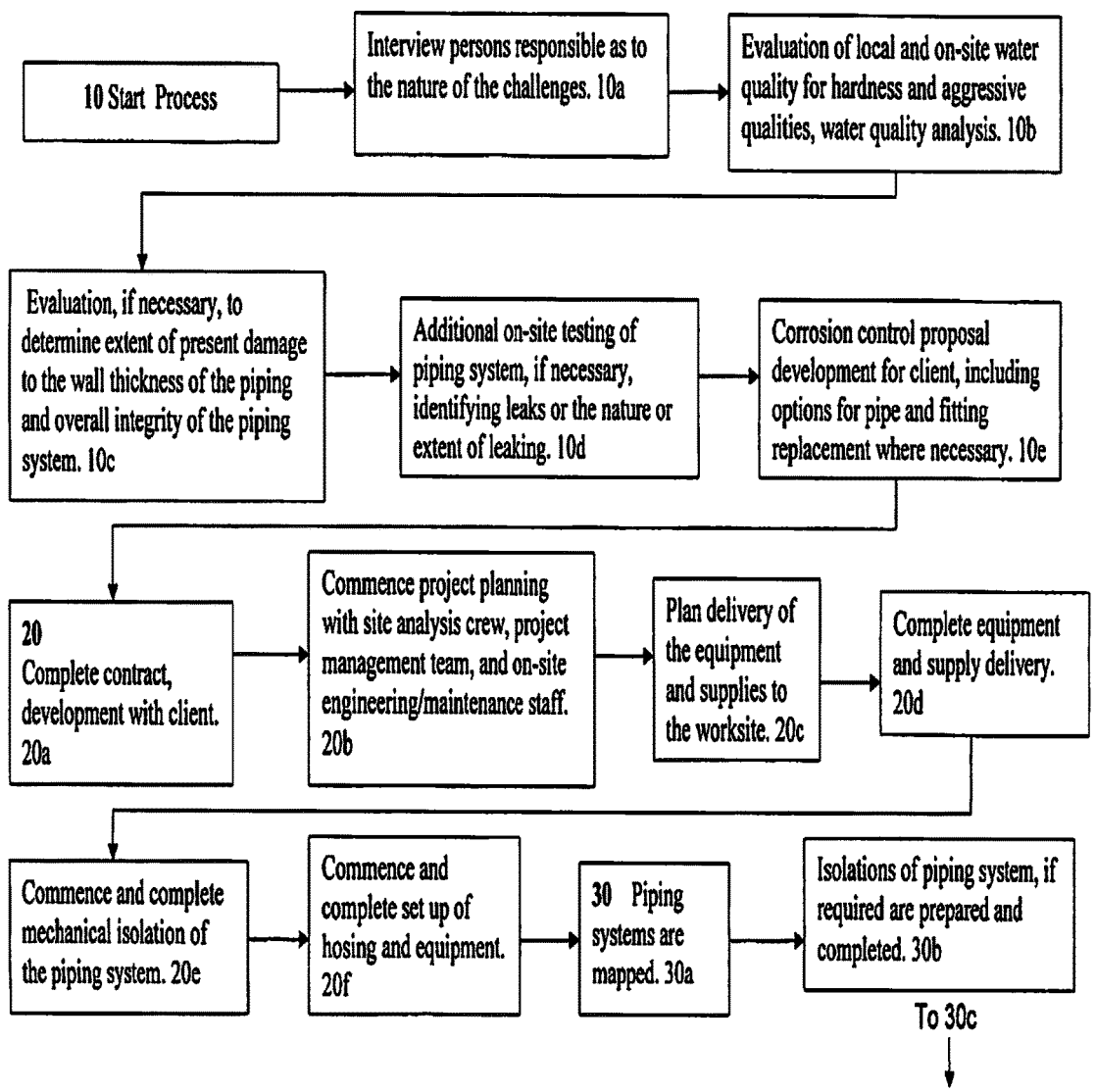

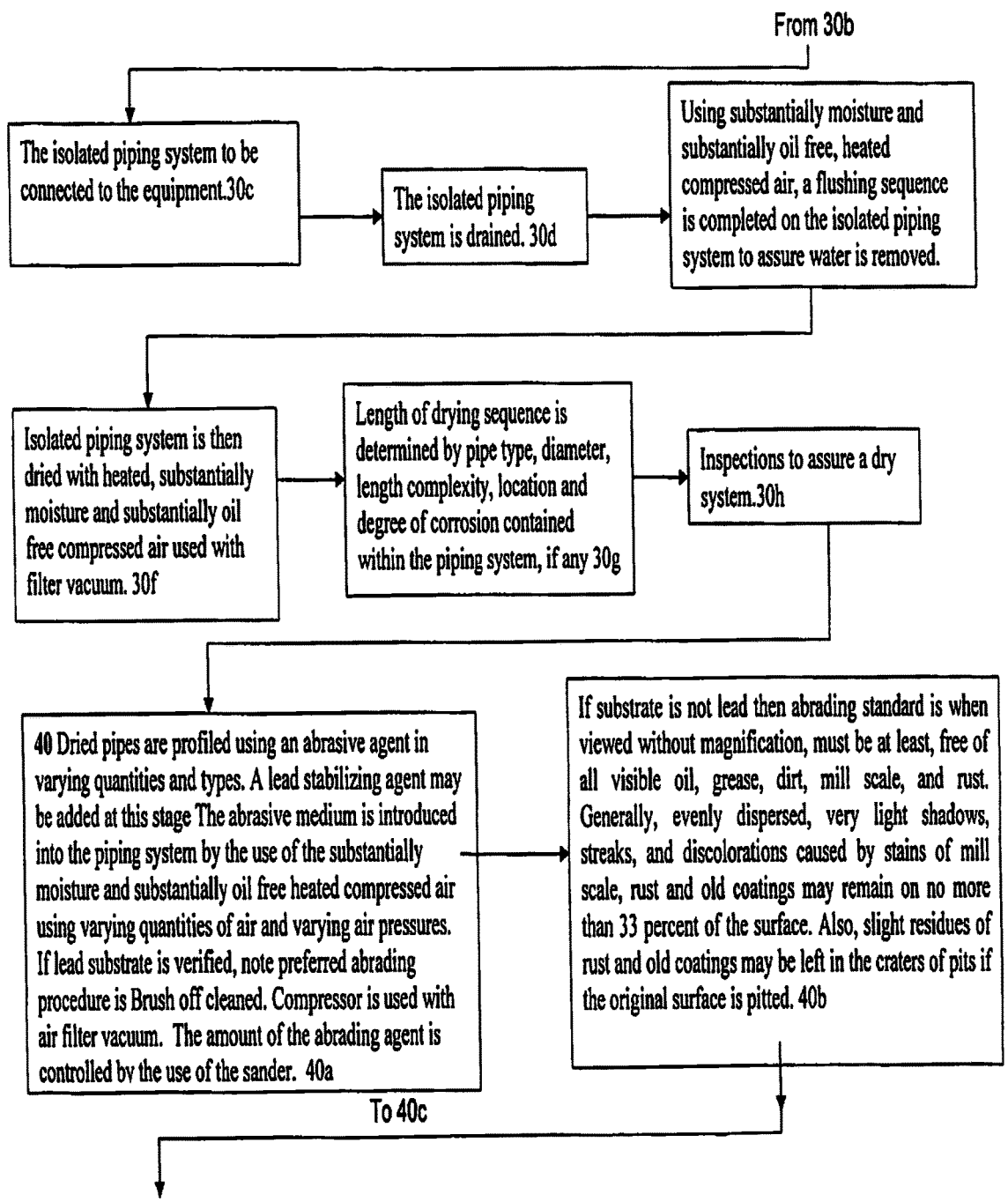

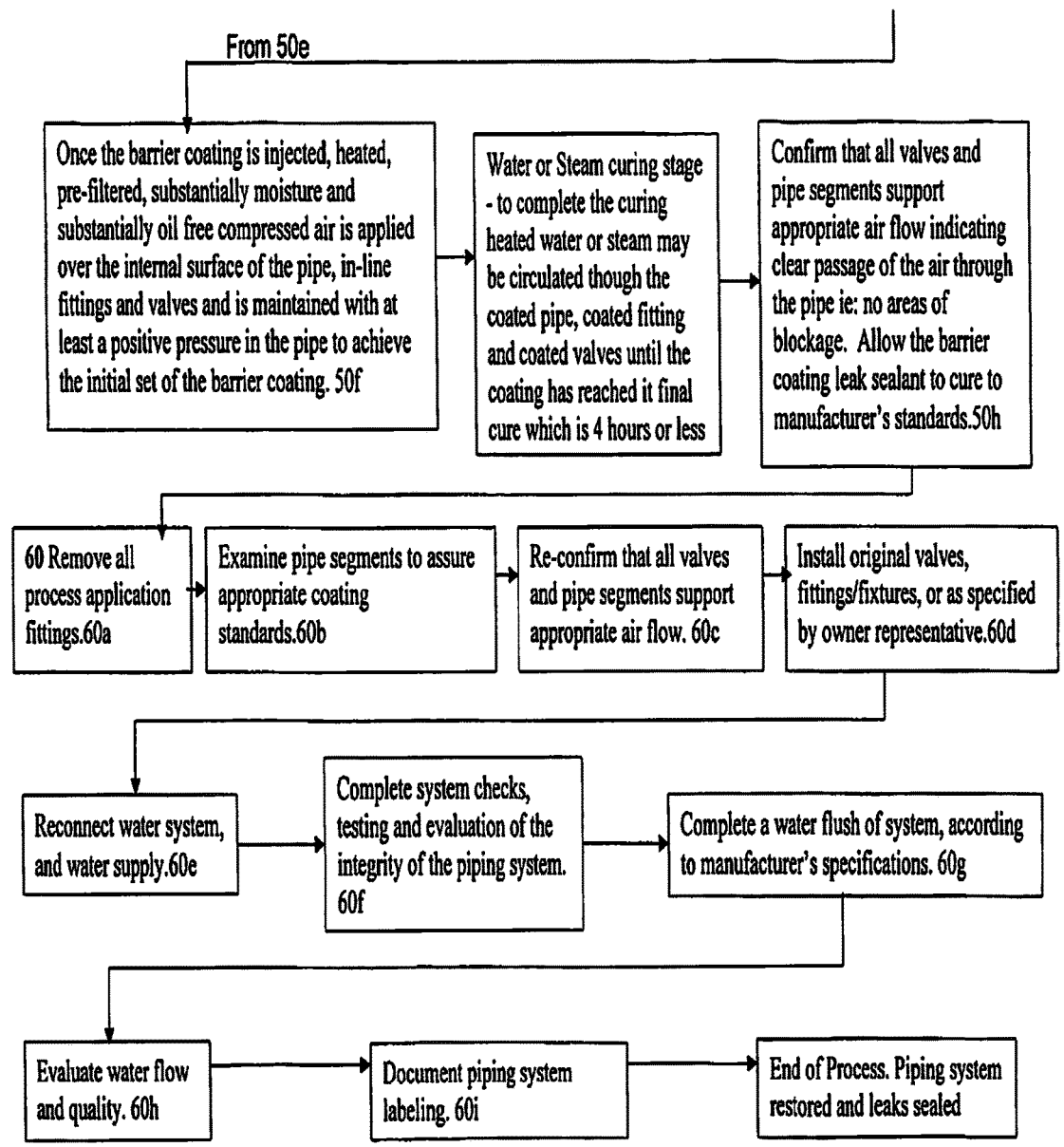

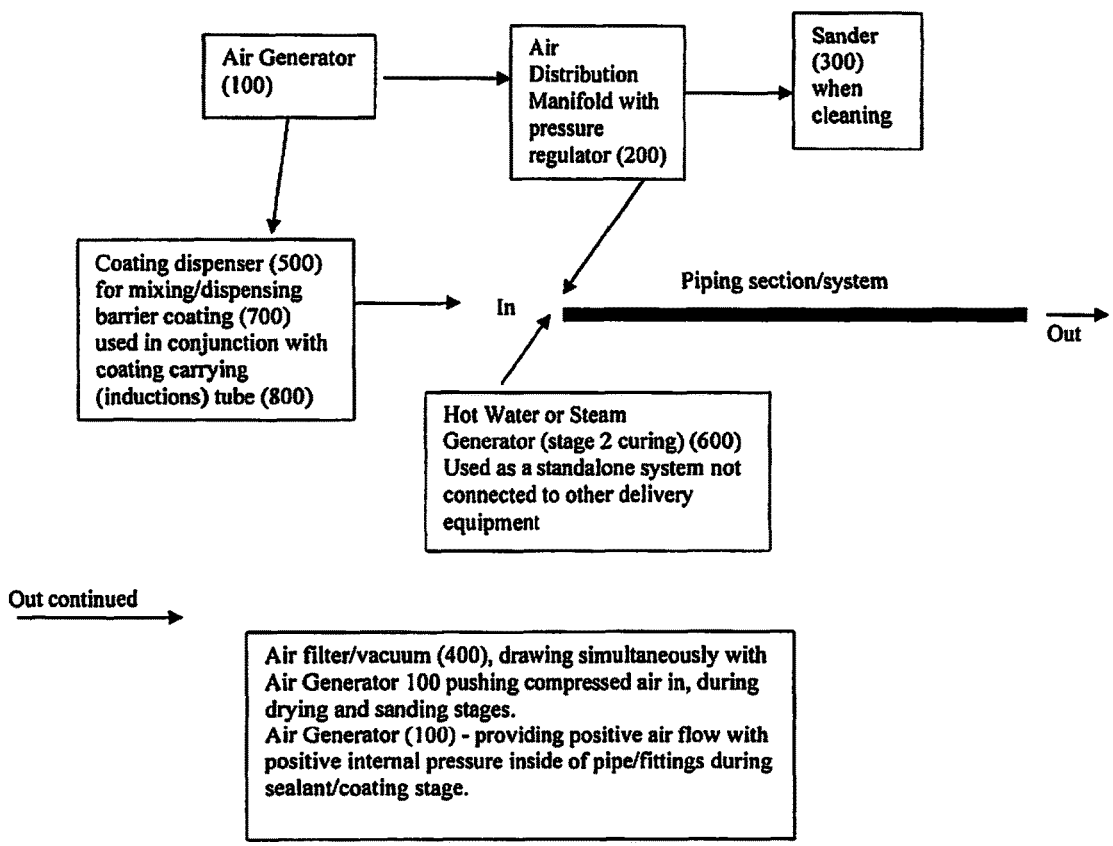

PROCESS FOR COATING THE INTERIOR SURFACE OF UNDERGROUND PIPES

RELATED APPLICATIONS

This application is a Divisional Application of U.S. patent application Ser. No. 14/829,248 filed Aug. 18, 2015, now U.S. Pat. No. 9,611,973, which is a Divisional of U.S. patent application Ser. No. 14/011,260 filed Aug. 27, 2013, now U.S. Pat. No. 9,273,815, which is a Divisional Application of U.S. patent application Ser. No. 13/566,377 filed Aug. 3, 2012, now U.S. Pat. No. 8,524,320, which claims the benefit of priority to U.S. Provisional Patent Application Ser. No. 61/595,794 filed Feb. 7, 2012, and this invention is a Continuation-In-Part of U.S. patent application Ser. No. 13/210,659 filed Aug. 16, 2011, now U.S. Pat. No. 8,887,660, which is a Divisional Application of U.S. patent application Ser. No. 12/947,012 filed Nov. 16, 2010, now U.S. Pat. No. 8,354,140, which is a Divisional Application of U.S. patent application Ser. No. 12/378,670 filed Feb. 18, 2009, now U.S. Pat. No. 8,206,783, which is a Divisional Application of U.S. patent application Ser. No. 11/246,825 filed Oct. 7, 2005, now U.S. Pat. No. 7,517,409, which is a Divisional Application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002, and this invention is a Continuation-In-Part of U.S. patent application Ser. No. 12/813,873 filed Jun. 11, 2010, now U.S. Pat. No. 8,343,579, to the same assignee as the subject invention, which is a Divisional of U.S. patent application Ser. No. 12/723,115, filed Mar. 12, 2010, now U.S. Pat. No. 8,033,242, which is a Divisional of U.S. patent application Ser. No. 11/649,647 filed Jan. 4, 2007, now U.S. Pat. No. 7,858,149 which is a Continuation-In-Part of U.S. patent application Ser. No. 11/246,825 filed Oct. 7, 2005, now issued as U.S. Pat. No. 7,517,409, which is a Divisional of U.S. patent application Ser. No. 10/649,288 filed Aug. 27, 2003, now issued as U.S. Pat. No. 7,160,574 and which claims the benefit of priority to U.S. Provisional Patent Application Ser. No. 60/406,602, filed Aug. 28, 2002. The entire disclosure of each of the applications listed in this paragraph are incorporated herein by specific reference thereto.

FIELD OF INVENTION

This invention relates to pipe linings, and more specifically to methods, processes, composition, systems and apparatus used to prepare and place protective barrier coatings inside of lead or copper drinking water type pipes while the water pipes are left "in place" without having to dismantle the water pipes, so that applied coatings reduce heavy metals, such as lead and copper, from leaching from the installed pipes and fittings to less than approximately 10 µg/L (10 ppb), and where pipes can be returned to service from at least approximately 1 to approximately 4 hours, and preferably within approximately 1 to approximately 2 hours, and when cured, specific leachates, such as but not limited to Bisphenol A and Epichlorohydrin will be (less than) <1 µg/L (1 ppb) with overall TOC levels measured at (less than) <2.5 mg/L (2.5 ppm).

BACKGROUND AND PRIOR ART

Metal based drinking water pipes and fittings such as those formed using lead and copper are known to leach toxic materials such as lead and copper into the drinking water supply. The presence of lead and other metals in drinking water poses a range of risks to human health, including the retardation of some aspects of child development, the inducement of abortion, and other clinical disorders. The extent of these risks has not been quantified at the European Union (EU) scale. A number of sampling methods are in use in the EU, the United States and Canada, some of which are inadequate for determining the concentrations of lead in drinking water at consumers' taps. The new legal standard requirement in the EU starting in 2013 will require that lead amounts in drinking water up to the point of delivery at the consumers building cannot exceed 10 µg/L (10 ppb (parts per billion).

The non-compliance with the EU standards for lead in drinking water has been under-estimated. Emerging data on existing lead and copper based water pipes in some European Union countries indicates significant non-compliance with these standards in, particularly with the 10 µg/L (10 ppb (parts per billion) standard that will become a legal requirement in 2013. In addition the current interim standard of 25 µg/L (25 ppb) is also exceeded in some locations.

An initial estimate is that 25% of domestic dwellings in the EU have a lead pipe, either as a connection to the water main, or as part of the internal plumbing, or both, potentially putting up to approximately 120 million people or more at risk from lead in drinking water within the EU.

Current corrective remedies include the use of chemical additions to the water supply such as dosing with phosphate-based materials, conventional dig and replace methods, pull through, moling or slip lining methods and the use of internally placed resin based coatings.

Internally placed resin based coatings have thus far presented a non-economical solution to the problem of reducing lead levels to the less than the new 10 µg/L (10 ppb) standard. Current coating processes and techniques usually require long cure times and potential leachates coming from the coating especially when the coatings are subject to high surface area of pipe wall to water volume in small diameter piping systems. For example, pipes less than approximately 50 mm (2") in diameter and are tested accordingly for leachates.

It is common that the internal diameter of service pipes range from approximately 12 mm (½") to approximately 50 mm (2") ie, having high surface area of pipe wall to water volume. In order to not restrict the flow of the liquid through the coated small diameter pipe, that is pipes that have an interior diameter, ID, in the ranges of approximately 12 mm (½") to approximately 50 mm (2"), the placed linings typically range in thickness from an average of approximately 100 microns (4 mils) to approximately 400 microns. (16 mils) Thin set linings, in more or less the above stated range of thickness, can be prone to the application problem of pin holing occurring in the uncured coating as well as being contaminated with free lead particulates during the application and curing stage, making compliance to the 10 µg/L (10 ppb) maximum lead content in drinking water standard difficult and potentially impossible to achieve. This invention overcomes these problems.

The use of compression fittings, in-line connectors or couplings and in-line valves are common in the industry. However, when these in-line connectors and valves are used, pipe ends and exterior portions of the pipe within the fittings maybe left exposed, leaving direct water to metal contact.

In the United Kingdom, products that come into contact with public drinking water must conform to various regulations including Drinking Water Inspectorate Regulation 31. Regulation 31 of the Water Supply (Water Quality) Regulations 2000 implements Article 10 of the Council of the European Union Drinking Water Directive (DWD) in England and Wales for all chemicals and construction products used by water undertakers, from the source of the water, up to the point of delivery to the consumer's building. This regulation sets out how approvals can be given to such construction products and materials that do not prejudice water quality and consumer safety.

Article 10 of the DWD requires Member States shall take all measures necessary to ensure that no substances or materials for new installations used in the preparation or distribution of water intended for human consumption or impurities associated with such substances or materials for new installations remain in water intended for human consumption in concentrations higher than is necessary for the purpose of their use and do not, either directly or indirectly, reduce the protection of human health. Under Article 10, the interpretative document and technical specifications pursuant to Article 3 and Article 4 (1) of Council Directive 89/106/EEC of 21 Dec. 1988 on the approximation of laws, regulations and administrative provisions of the Member States relating to certain construction products shall respect the requirements of this Directive.

Piping systems, valves and fittings such as those used as communication and supply lines servicing buildings and within commercial buildings, apartment buildings, condominiums, as well as homes and the like that have a broad base of users that may be exposed to water that may be tainted by the leaching of metals such as lead and copper that have leached into the water supply at levels deemed to pose possible health concerns is the target of this invention.

Present corrective remedies include the use of chemical additions to the water supply such as dosing with phosphate-based materials, conventional dig and replace methods, pull through, moling or slip ling and the use of internally placed resin based coatings. When internally placed coatings are used they attempt to coat the interior of the pipe but leave pipe ends uncoated, internal fittings uncoated and the exterior of pipe sections that lay within internal fittings areas that are exposed to drinking water, uncoated. These uncoated areas when exposed to drinking water will continue to leach metals such as lead and copper into the water supply.

Corrective measures taken by adding phosphates to the drinking water to reduce lead from leaching from substrate materials is presently a common practise in the United Kingdom (UK). However, phosphates have been identified as being scarce and resources are being depleted rapidly on a worldwide basis.

The UK places phosphate into the public water supply to reduce plumbosolvancy (dissolution of lead from old pipework) and has used phosphate dosing ranges from 0.5-1 mgP/L in low alkalinity areas to 1-1.5 mgP/L in high alkalinity areas. Most water is dosed with phosphate because it is currently not practicable to target properties with lead supply or internal plumbing. Taking 1 mgP/L as an average and 17395 ML/day into supply equates to about 15,000 t$P_2O_5$/y. To put this in context, the UK's Department for Environmental, Food and Rural Affairs (Defra (2011)) reports the total phosphate fertiliser use in the UK is about 200,000 t$P_2O_5$/y. There are additional problems with using present thermoset resin based coating systems. It is widely known that thermoset resin based coating systems do not readily complete cure at ambient temperatures, leaving un-reacted organic moieties and complexes available for water extraction or leaching. This leaching can be further compounded with the use of chlorinated water.

Thus, the need exists for a solution to deliver a protective coating system that protects the pipe and fittings, from the effects of corrosion and reducing metals from unacceptable levels from leaching into the water supply, without the need to fully disassemble the pipe from the fittings wherein the coating is placed in a single coat operation. A further need exists wherein the use of phosphates used, in dosing the water to reduce lead and metals leaching, can be reduced or replaced, thereby reducing demand on this scarce and depleting resource.

Present methods to accelerate the cure of lining materials, once placed inside a pipe may involve the use of hot water or steam circulated through the piping system. In these present systems the coating is separated from the steam or water by a flexible membrane or the water curing stage is initiated only after the coating has reached its B stage of curing.

U.S. Pat. Nos. 5,622,209 and 5,007,461 and 5,499,659 to Naf each generally require long pipe system down times before piping systems can be returned to service. Generally, the patents describe methods that include "blowing through" the coating in which air was left to stream over the uncured coating "for a further 30 minutes, and the conduit was sealed at the top and bottom at the end of the blowing period. Two days later, the conduit was reconnected to the network and thoroughly flushed beforehand." The Naf patents refer to adducts but not phenol free and plasticizer free amine adducts added to the curing agent. There is no mention in these references of curing with water or moisture contact. Phenol free and plasticizer free amine adducts were not commercially available at the time of the 1988 to 1995 filing dates of the Naf patents.

The Pasteur Document dated 2002, associated with Naf, references a 48 hour cure time.

U.S. Pat. No. 5,707,702 to Brady describes a coating having a pot life (working time not cure) of 1-4 hours and in the embodiment says left to cure for 24 hours. These embodiments do not describe the use of phenol free and plasticizer free amine adducts.

There is no mention in these references of curing with water or moisture contact.

U.S. Pat. Nos. 7,160,574 and 7,517,409 and U.S. Pat. Nos. 7,858,149, 8,033,242 and 8,026,783 to Gillanders et al, assigned to the same assignee as the subject invention, which are incorporated by reference, describe pipe coating systems and methods that all refer to restoring piping systems to services within times from less than 24 to 96 hours, but do not reference the use of phenol free and plasticizer free amine adducts added to the curing agent or using water or steam, in the curing stage.

U.S. Pat. Nos. 6,739,950 and 7,041,176 to Kruse do not mention the use of phenol free and plasticizer free amine adducts added to the curing agent or water cure of the barrier coatings. Curing requires at least day long cure times and high cure temperatures. For example, Kruse '176 describes a 24 hour time period for curing their coatings. Additionally, each of the Kruse references require high heat on pipe 100-120° F. (38-49° C.), while the subject invention requires substantially lower air temperatures while yielding much quicker cure times.

The U.S. Navy Research Document 1997, entitled: Control of Lead in Drinking Water, epoxy requires 12-18 hours of hot air to cure and, no mention of using moisture to cure. Furthermore, there is no mention of the use of phenol free and plasticizer free amine adducts added to the curing agent.

The U.S. Military Standard, 2001—Public Works Bulletin 420-49-35 requires 24 hour cure with 75° F. (24° C.) air, there is no mention of using moisture while curing the coating and there is no mention of the use of phenol free and plasticizer free amine adducts added to the curing agent.

U.S. Pat. No. 4,966,790 to Iizuka describes examples which show long time lines to cure, with a minimum of 24 hours of air cure prior to a water cure stage. None of the curing agents describe the use of phenol free and plasticizer free amine adducts, no disclosure of toxicological data. The epoxy described in Iizuka, after 24 hours, prior to the water curing stage would have passed its plastic state ie A-Stage of curing.

U.S. Pat. No. 8,053,031 to Stanley describes the use of an anhydride introduced into the resin, which is not the use of a phenol free and plasticizer free amine adduct added to the curing agent as the subject invention practices. Stanley '031 describes in Table 1 contained in the '031 patent, using a measurement of BPA being leached from the cured epoxy after 2 days at 100 µg/L (100 ppb) and at 20 µg/L (20 ppb) in the 2 examples given. This reference makes no mention of epichlorohydrin or TOC levels, which is required under current regulations, there is also no data to demonstrate the effects of the coating over a lead substrate.

U.S. Published Patent Application 2010/0266764 to Robinson et al. describes a polyurethane coating technique for pipe lining, which has a rapid setting of 3 to 6 minutes. However, this process would not result in coating all of the interior surfaces of the pipes, as well as causing clogs inside the pipe because it sets so quickly. This type of coating cannot pass through intersections and valves and fittings without clogging. Also, polyurethane based coatings are not known to meet toxicology requirements for small diameter drinking water pipes (such as those having an ID of 2 inches (or 50 mm)) or less in size, that can be placed in-situ and returned to service having contact with potable water within 12 hours or less.

SUMMARY OF THE INVENTION

A primary objective of the invention is to provide methods, processes, compositions, systems and devices for placing a barrier coating to the interior diameter (ID) of a drinking water pipe section and/or drinking water piping systems that can include certain fittings where the coating can be placed to the outside diameter (OD) of exposed ends of small diameter pipes within fittings, in a single coat operation, so that the barrier coating provides a protective barrier coating reducing the effects of corrosion including leaching of metals such as lead and copper into the drinking water supply.

A secondary objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals by initially preparing the interior walls of the pipes, interior walls of in-line fittings and valves, and outer surfaces of exterior ends of pipe portions within the fittings/valves to receive the barrier coating.

A third objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals in one operation.

A fourth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals in a cost effective and efficient manner.

A fifth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals which is applicable to small diameter piping systems having an interior diameter from at least approximately 12 mm.

A sixth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, in a single operation which is applied to pipes, valves and fitting "in place" (in-situ) minimizing the need for opening up walls, floors ceilings, or grounds.

A seventh objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, in a single operation, where once the existing piping system is restored with a durable barrier coating, the common effects of corrosion from water passing through the pipes, valves and fittings will be delayed.

An eighth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including the leaching of metals, in a single operation, to clean out blockage where once the existing piping system is restored, users will experience an increase in the flow of water, which reduces energy cost, to transport the water based on enhanced hydraulic capabilities giving greater water flow through the pipes.

A ninth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including the leaching of metals, in a single operation, where customers benefit from the savings in time and expenses associated with the restoration of an existing piping system or section.

A tenth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, in a single operation, where customers benefit from the economical savings associated with the restoration of an existing piping system, since walls, ceilings, floors, and/or grounds are not always required be broken and/or cut through as occurs with existing restoration processes.

An eleventh objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, in a single operation, where income producing properties experience savings by remaining commercially usable, since operational interference and interruption of income-producing activities is minimized.

A twelfth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including the leaching of metals in a single operation, and where health benefits increase since water to metal contact is reduced by the barrier coating reducing the leaching of metallic and potentially other harmful products from the pipe, valves and fittings into the water supply such as but not limited to lead from solder joints, lead pipes, lead from other substrates and any excess leaching of copper, iron or lead and the like.

A thirteenth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals from in pipes, valve and fittings, in a single operation where the pipes, valves and fittings are being restored and repaired, in-place, thus causing less demand for new metallic pipes and parts, which are non-renewable resources.

A fourteenth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, in a single operation, using a less intrusive methods of repair where there is less waste and a reduced demand on landfills.

A fifteenth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including the leaching of metals in a single operation, and where the process uses specially filtered air reducing impurities from entering the piping system during the coating process.

A sixteenth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, in a single operation, and where the equipment used operates safely, cleanly, and efficiently in high traffic areas.

A seventeenth objective of the invention is to provide methods, processes, compositions, systems and devices for providing a barrier coating inside, to the exterior and to exposed ends of small diameter pipes, placing the coating through fittings and valves to reduce pipe, valve fitting and substrate contact with drinking water, whereas the barrier coating provides a protective barrier coating reducing the effects of corrosion including the leaching of metals, in a single operation where the barrier coating material can be placed in a variety of piping environments and operating parameters such as but not limited to a wide temperature ranges, at a wide variety of airflows and air pressures and the like.

An eighteenth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, in a single operation, where the barrier coating material and the process is functionally able to deliver turnaround of a restored piping system to service within at least approximately 1 to 2 hours.

A nineteenth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including the leaching of metals, in a single operation, and where the barrier coating material is meets toxicological and other standards required by NSF (National Sanitation Foundation) Standard 61 Section 5, UK's Drinking Water Inspectorate Regulation 31, British Standard 6920, EN 12873-2:2005, the Council of the European Union Drinking Water Directive or equivalents for use in domestic water systems where pipes have an internal diameter from at least approximately 12 mm (½") and the in-place field (in-situ) applied curing period is at least approximately 1 to approximately 2 hours.

A twentieth objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, the interior of pipes having diameters from at least 12 mm is prepared using dry particulates, prior to coating the interior pipe walls.

A twenty first objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals, without having to section off small sections of piping for cleaning and coating applications.

A twenty second objective of the invention is to provide methods, processes, compositions, systems and devices for cleaning the interiors of an isolated piping system in a single pass run operation.

A twenty third objective of the invention is to provide methods, processes, compositions, systems and devices for providing a barrier coating inside, to the exterior and to exposed ends of small diameter pipes, placing the coating through fittings and valves to reduce pipe, valve, fitting and substrate contact with drinking water, whereas the barrier coating provides a protective barrier coating reducing the effects of corrosion including leaching of metals in a single pass run operation.

A twenty fourth objective of the invention is to provide methods, processes, compositions, systems and devices for providing a barrier coating inside, to the exterior and to exposed ends of small diameter pipes, that uses a hydrophobic lining material which can be cured with air alone or in combination with water or steam without the need of a flexible membrane that separates the uncured barrier coating from the water or steam used during the curing process.

A twenty fifth objective is to provide methods, processes, compositions, systems and devices for providing a barrier coating inside, to the exterior and to exposed ends of small diameter pipes, that adds phenol free and plasticizer free adducted amines in the curing agent of the coating to reduce leaching levels of BPA and Epichlorhydrin.

A twenty sixth objective is to provide methods, processes, compositions, systems and devices for providing a barrier coating inside, to the exterior and to exposed ends of small diameter pipes which uses a blast media cleaning process in the presence of lead substrates, where blasting media can include at least one of: calcium, silica, garnet, alumina, silicone, sodium, sodium bicarbonate, glass, crushed nut casings, plastic abrasives both thermoset and thermoplastic such as but not limited to, plastics, acrylic, urea, melamine, thermoplastic, bio plastic, polyamide, nylon, thermosetting polymer or cellulose which all can be used alone, in combination or in part with other abrasive materials.

A twenty seventh objective is to provide methods, processes, compositions, systems and devices for providing a barrier coating inside, to the exterior and to exposed ends of small diameter pipes, that uses, which can stabilize the lead substrate in lead water pipes after the cleaning process with an in-situ application of a liquid lead stabilizer that is comprised of water soluble phosphate wherein in phosphates can include, phosphates, calcium orthophosphate, calcium phosphate, trisodium phosphate, monocalcium orthophosphate, tricalcium orthophosphate and the like. The stabilizer can have a pH of at least 8.

A twenty eighth objective is to provide methods, processes, compositions, systems and devices for providing a barrier coating inside, to the exterior and to exposed ends of small diameter pipes, which can stabilize the lead substrate in lead water pipes after the cleaning process with an in-situ application of an anionic or nonionic solution.

A twenty ninth objective is to provide methods, processes, compositions, systems and devices for providing a barrier coating inside, to the exterior and to exposed ends of small diameter pipes, which can reduce lead leaching, from a substrate containing lead (ie: lead water pipes and fittings containing lead), to less than approximately 10 µg/L (10 ppb), preferably less than approximately 1 µg/L (1 ppb).

A thirtieth objective is to provide methods, processes, compositions, systems and devices for providing a barrier coating inside, to the exterior and to exposed ends of small diameter pipes, which can reduce lead leaching, from a substrate containing lead (ie: lead water pipes), to less than approximately 10 µg/L (10 ppb) preferably less than 1 µg/L (1 ppb) which allows for a reduction of the practice of using phosphates to reduce lead leaching.

A thirty first objective is to provide methods, processes, compositions, systems and devices for providing a barrier coating inside, to the exterior and to exposed ends of small diameter pipes, where the barrier coating will create at least an approximately average 100 micron (4 mils) covering to the inside of the piping system and fittings and will seal leaks spanning openings up to approximately 125 mils.

The piping systems, valves and fittings covered by this invention can be made of various materials such as lead, galvanized steel, black steel, brass, copper or other materials such as PVC, CPVC and composites including plastics, where a barrier coating lining is used as an alternative to pipe replacement or repair and reduces use of chemically dosing water supplies which are commonly used to reduce metals leaching from the water carrying pipes into the drinking water supply.

The novel coating process can be completed, without having to physically remove and replace all the pipes, where the interior diameters of the pipe are coated and if the pipe is located within fittings the exterior ends and the piping's outside diameter subject to water exposure, contained within fittings and valves, can be coated in a single operation. If needed, the novel coating is capable of being applied in multiple layers.

The coating material when cured "in-place", is capable of allowing the coated pipes, fittings and valves to be placed back into service in a period of at least approximately 1 hour to approximately 4 hours, preferably at least approximately 1 hour to approximately 2 hours. The coating is further suitable to application to potable water carrying pipes having an internal diameter from at least approximately 12 mm (12").

With the novel coating and coating process, leaching of toxic compounds, such as Bisphenol A (BPA) and Epichlorohydrin will be less than approximately 1 µg/L from the cured coating, when the coating is cured and then soaked in an equivalent of 1 liter of water against the estimated internal diameter surface area of a pipe having an internal diameter of at least approximately 12 mm (an approximate SA:Vol of 33.33 $dm^{-1}$). Testing of the barrier coating has been conducted, when the coating is applied and cured within its specified curing period i.e.: a period of at least approximately 1 hour to approximately 4 hours, preferably approximately 1 to approximately 2 hours and then tested for Bisphenol A and Epichlorohydrin and Total Organic Compounds.

Testing methods and thresholds are those described in UK's Drinking Water Inspectorate Regulation 31, British Standard 6920:2000 tested according to EN 12873-2:2005, EU Drinking Water Directive (DWD) Council Directive 98/83/EC and EU Construction Products Directive (89/106/EEC) for field applied coatings. Based on three, 72 hour±1 hour soaks with a water temperature of at least 23° C.±2° C., Bisphenol A and Epicholohyrin extractables will be measured at less than approximately 1 µg/L (1 ppb), TOC extractables have been measured at less than approximately 2.5 mg/L (2.5 ppm). When the coating is placed and cured on a lead substrate and tested for lead leaching after a 72 hour±1 hour period of stagnation, lead in leachate has been measured to be less than approximately 10 µg/L (10 ppb), and has been measured to be less than approximately 1 µg/L (1 ppb).

In particular, when the preferred method of substrate preparation is conducted portions of previously applied coatings/lead inhibitors that are loose will be removed in a brush off approach leaving adherent residuals on the substrate surface.

Additionally, the preferred coating conforms to BS 6920: 2000 tested to EN 12873-2:2005, for a) odour and flavour of water, b) appearance of water, c) growth of aquatic microorganisms, d) extraction of substances which would be of concern to public health and e) extraction of metals, for contact with drinking water with temperatures up to 85° C.

An embodiment of the invention provides for methods, processes, composition, systems and apparatus used to prepare and place a specialized 2 part thermoset resin as a protective barrier lining material coating, inside of drinking water pipes, valves and fittings formed from materials that leach toxic metals such as lead and copper into the drinking water. The novel lining material can coat interior walls of pipe sections and piping systems, where pipes can have bends, t" intersections, varying diameters and can also have in-line pipe connectors, or valves where pipe ends and the exterior walls (outside diameters) of the pipes which exposed to water within the valve or fittings.

The novel protective barrier coating can be placed inside the pipes, valves or fittings while "in-place", wherein the protective barrier coating can be applied under positive pressure in a single operation to the interior walls of pipes, fittings and valves and pipe ends and the exterior portions of pipes where pipe ends and exteriors are situated within fittings of small diameter pressurized and non-pressurized metal and plastic type pipes and fittings.

The types of water service lines that can be treated and coated can include but is not limited to hot water lines, cold water lines, potable water lines, fire sprinkler lines, natural gas lines, drain lines, pressurized and non-pressurized pipes and the like. Such service lines can be located both outside or underground and/or used in multi-unit residential buildings, office buildings, commercial buildings, schools, hospitals and single family homes and the like.

An embodiment can include a 2 part thermoset lining material, having hydrophobic qualities, can be cured in-place using warm air, from approximately 10° C., alone or in combination with water or steam or a combination of such without the need for a membrane barrier separating the water or steam from the lining material/coating, wherein the water or steam curing stage can be initiated while the coating material is still in its A-Stage of curing, being an early stage in the reaction in which the coating material is fusible and still soluble in certain liquids.

The base-curing agent can incorporate an amine adduct where the adduct is a phenol free and plasticizer free type. In the presence of a lead substrate, the process can incorporate lead stabilizing agents, select blasting abrasives and applications that use filters to reduce sediment and the fixed gas content of water used in the water curing stage.

The invention described here overcomes the problems associated with present methods, application and coatings to provide an economical solution meeting economical turn-around times i.e.: fast cure, when applied to small diameter pipes, having internal diameters from at least approximately 12 mm, meeting at least the current regulatory requirements, while providing a protective coating that can be applied in a single coating operation. Such coatings will provide a protective barrier coating to the interior of the pipe and can be applied through fittings where pipe ends and the exterior of the pipe, within the fitting which are exposed to the drinking water.

In order to avoid the expense and inconvenience of replacing the pipes and locating these fittings and replacing them there is a need for the invention which is to provide a protective barrier coating that can be applied to the inside of a pipe but can also be applied through the fittings, coating the interior of the pipe and coating the exposed pipe ends and the exterior portions of the pipes which are exposed to the drinking water that are contained within a fitting, in a single coating operation and being cured and be returned to service in at least approximately 1 to approximately 2 hours and reducing lead levels leaching into the water supply to less than 10 µg/L (10 ppb).

When the lining material is being applied the invention can use preferred methods and materials to reduce the effects of pin holing in the coating. When being applied to a lead substrate the preferred methods can reduce free lead particulates on the substrate from contaminating the lining material when the lining material, in its fluid state, is being placed and then cured on the substrate. The novel methods, process, compositions and systems of pipe restoration prepares and protects small diameter piping systems such as those within the interior diameter range of from at least approximately 12 mm and can include straight and bent sections of piping from the effects of water corrosion, erosion and electrolysis thus reducing metals and other leachates from leaching into the water supply and extending the life of small diameter piping systems.

The barrier coating used as part of the novel process, method and system, can be used in pipes servicing potable water systems, meeting the toxicological and other standards described in NSF (National Sanitation Foundation) Standard 61, Section 5, UK's Drinking Water Inspectorate Regulation 31, British Standard 6920:2000, EN 12873-2:2005, the Council of the European Union Drinking Water Directive or equivalents. The novel method, process and system allows for barrier coating of interior and exterior parts of pipes, pipe ends, interior of valves and in-line fittings, in a single operation to hot or cold potable water lines.

The novel method of application of the barrier coating is applied to pipes, fittings and valves "in-place" eliminating the traditional destructive nature associated with a re-piping job. Typically one system or section of pipe can be isolated at a time and the restoration of the system or section of pipe can be completed in less than one day (depending upon the size of the project) and type of application) wherein the coated pipe, fitting or valves are capable of being placed back into water service in at least approximately 1 to approximately 2 hours.

The novel application process and the properties of the coating ensure the interior of the piping system is fully coated. Thermoset coatings are characterized by their durability, strength, adhesion and chemical resistance, making them an ideal product for their application as a barrier coating on the inside of small diameter piping systems, valves and fittings. The barrier coating will create at least an approximately average 100 microns (4 mils) covering to the inside of the piping system and will seal leaks spanning openings up to approximately 125 mils.

The novel method and system of corrosion control by the application of a barrier coating can be applied to existing piping systems in-place, with no need to remove in-line fittings and valves in the same operation.

The invention includes novel methods and equipment for providing barrier coating corrosion and a repair method for placement of a barrier coating and sealing leaks to the interior walls of small diameter piping systems including, coating exterior ends of pipes within fitting and coating interior surface areas of valves and in-line fittings in the same operation. The novel process method and system of internal leak repair and corrosion control can include at least three basic steps: Air drying a piping system to be serviced; preparing the piping system using an abrasive agent and applying the barrier coating to a selected coating thickness inside the pipes, fittings and valves.

The novel invention can also include additional preliminary steps of: diagnosing problems with the piping system to be serviced, measuring lead levels in the water prior to coating, planning and setting up the barrier coating project onsite, inducting the mixed coating prior to placement, placement of the coating, curing the coating using air alone or with water or steam, or combination thereof. Finally, the novel invention can include a final end step of evaluating the system after applying the barrier coating and re-assembling the piping system and an analysis of the lead content in the drinking water may be completed after system has been restored to service.

Further objects and advantages of this invention will be apparent from the following detailed description of the presently preferred embodiments which are illustrated schematically in the accompanying drawings.

BRIEF DESCRIPTION OF THE FIGURES

FIGS. 1A, 1B and 1C shows the fifteen (15) general steps for the product application of the novel thermoset lining to the piping sections/system for applying the novel barrier coating leak sealant.

FIGS. 2A, 2B, 2C and 2D shows a detailed process flowchart using the steps of FIG. 1 for providing the barrier coating.

FIG. 3 shows a flow chart of the set-up for the invention.

DESCRIPTION OF THE PREFERRED EMBODIMENTS

Figure 2C:
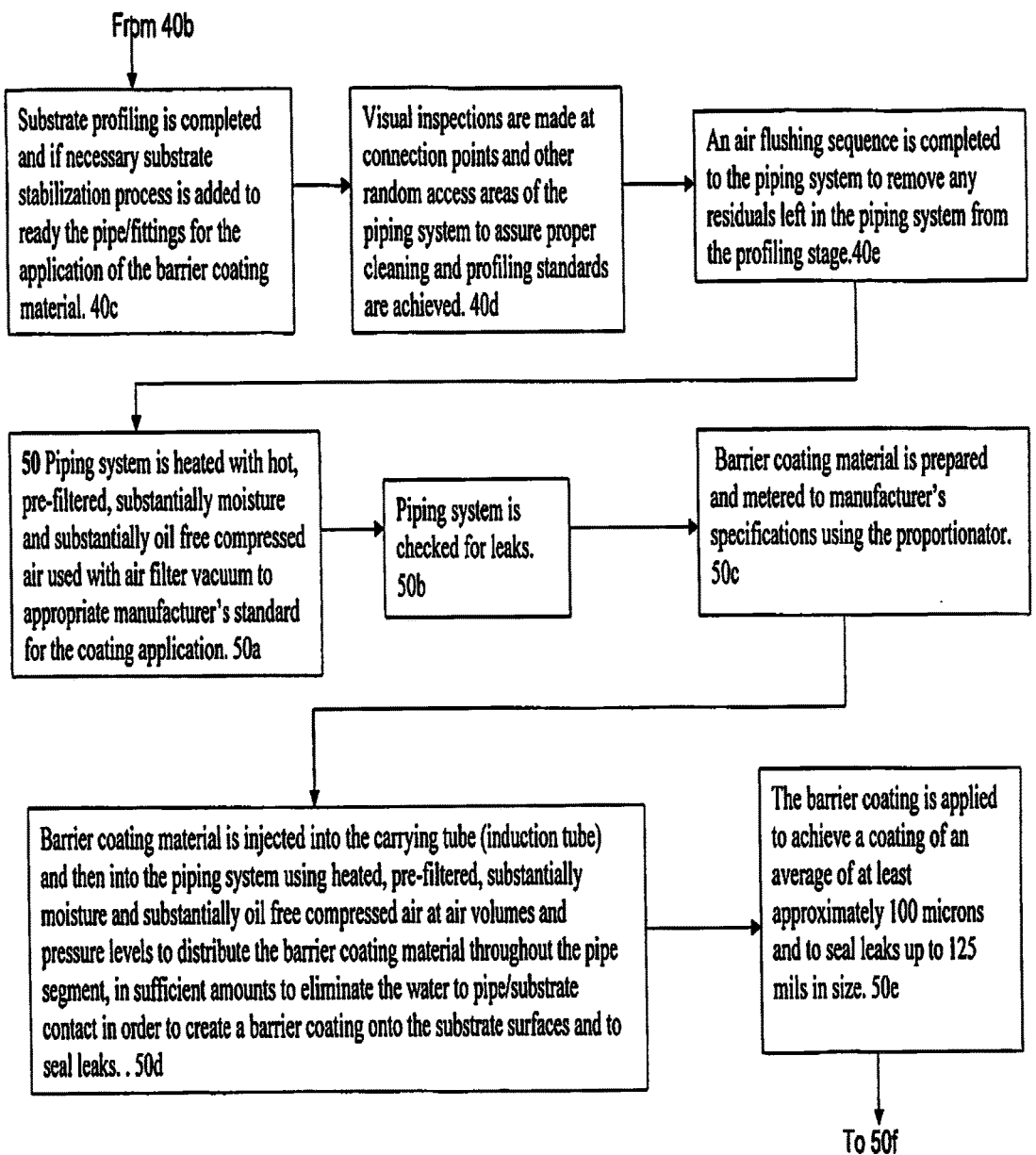

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

This application is a Divisional application of U.S. patent application Ser. No. 14/829,248 filed Aug. 18, 2015, now allowed, which is a Divisional application of U.S. patent application Ser. No. 14/011,260 filed Aug. 27, 2013, now U.S. Pat. No. 9,273,815, which is a Divisional application of U.S. patent application Ser. No. 13/566,377 filed Aug. 3, 2012, now U.S. Pat. No. 8,524,320, which claims the benefit of priority to U.S. Provisional Patent Application Ser. No. 61/595,794 filed Feb. 7, 2012, and this application is a Continuation-In-Part of U.S. patent application Ser. No. 13/210,659 filed Aug. 16, 2011, now U.S. Pat. No. 8,887,660, which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002, all of which are incorporated by reference.

The invention described here overcomes the problems associated with present methods and application of coating materials to provide an economical solution, meeting economic turnaround times i.e.: fast cure, in small diameter pipes where the coating is subject to meeting the current regulatory requirements while providing a protective coating that can be applied in a single coating operation that will coat the interior of the pipe and coat through fittings where lead pipe ends and the exterior of the lead pipe, within the fitting, are exposed to the drinking water.

In order to avoid the expense and inconvenience of locating these fittings and replacing them there is a need for a methodology to provide a protective coating that can be applied through the pipe or fitting, coating the interior of the pipe and, the pipe ends and the exterior of the pipe where pipes are exposed within the fitting, in a single coating operation.

The invention uses a two component thermoset coating system specifically designed for use in small diameter pipeline applications. The material has certain thixotropic characteristics for enablement of application into small diameter pipes having an interior diameter from at least approximately 12 mm (½") to approximately 102 mm (4"), and preferably in the range of approximately 12 mm (½") to approximately 50 mm (2"), and being able to be applied through the interior of pipes and through in-line fittings and valves in the same operation.

Correctly applied, the coating provides corrosion protection, protection against pinhole leaks in the piping system and protection against leaching of substrate materials into the drinking water. The coating is engineered to be applied to both metallic and non-metallic pipes and fittings. Metallic pipes/fittings would include those made of steel, iron, copper, lead, stainless steel, galvanized steel, brass, aluminum and various alloy combinations. Non-metallic pipes/fittings would include those made of materials such as: CPVC (chorinated polyvinyl chloride), PVC (polyvinyl chloride), PEX (cross-linked polyethylene), PB (polybutylene), ABS (acrylonitrile butadiene styrene), HDPE (high-density polyethylene) and concrete.

The coating material can be injected into small diameter pipes or piping systems, which may have valves or in-line fittings, using substantially moisture free and substantially oil free filtered compressed air.

The application of the lining material is a combination of material and methodology, times and temperatures, resulting in a protective barrier coating providing a minimum average of no less than an approximate 100 microns (4 mils) coverage inside the pipe. The focus of the barrier coating is to provide a protective barrier coating to the interior pipe wall to assist in reducing water to metal contact and reduce lead leaching into the drinking water supply from exposed substrate surfaces which come into contact with drinking water, so that lead leaching will measure less than approximately 10 μg/L (10 ppb), preferably less than 1 μg/L (1 ppb) after the process is completed.

Coverage verification may be completed by a visual inspection and by measuring at accessible points in the piping system. Water flow rate checks can be conducted before and after the coating application.

The curing time of the coating is at least approximately 1 hour to approximately 2 hours, cured using air alone or with water or steam or a combination of such curing methods varying on several factors such as induction and temperature times, range of application temperatures and application conditions.

FIGS. 1A, 1B and 1C shows the fifteen (15) general steps for the product application of the novel thermoset lining to the piping sections/system for applying the novel barrier coating leak sealant. The fifteen (15) general steps will now be described.

1) Prepare Pre Coating Water Analysis.

Interview on site engineering staff, property managers, owners or other property representatives as to the nature of the challenges.

Evaluation of local and on-site water chemistry for hardness and aggressive qualities, knowledge of metal leaching into water supply.

Engineering evaluation, if necessary, to determine extent of present damage to the wall thickness of the piping, overall integrity of the piping system and water sampling for specific determinants such as lead.

Additional on-site testing of water, piping system, if necessary, identifying leaks or the nature or extent of leaking.

Corrosion control proposal development for client, including options for pipe and fitting replacement where necessary.

This step is further described in part, in the subject inventor's previous patent applications which include U.S. Provisional Patent Application Ser. No. 61/595,794 filed Feb. 7, 2012, U.S. patent application Ser. No. 13/210,659 filed Aug. 16, 2011, now U.S. Pat. No. 8,887,660 which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

2) Prepare Job Details

Complete contract development with client.

Commence project planning with site analysis crew, project management team, and engineering/maintenance staff.

Plan delivery of the equipment and supplies to the worksite.

This step is further described in part, in the subject inventor's previous patent applications which include U.S. Provisional Patent Application Ser. No. 61/595,794 filed Feb. 7, 2012,U.S. patent application Ser. No. 13/210,659 filed Aug. 16, 2011, now U.S. Pat. No. 8,887,660 which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

3) Transport to Job

Complete equipment and supply delivery to site.

This step is further described in part, in the subject inventor's previous patent applications which include U.S. Provisional Patent Application Ser. No. 61/595,794 filed Feb. 7, 2012, U.S. patent application Ser. No. 13/210,659 filed Aug. 16, 2011, now U.S. Pat. No. 8,887,660, which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

4) Prepare Access to Piping System or Section

This step depending on location of pipe may involve for example, using line locators, locating connection of communication pipe off of water main, location of curb tap and supply pipe, access where required. If pipe section is in a building, may involve locating mains, distribution lines, cutting access panels if required.

This step is further described in part, in the subject inventor's previous patent applications which include U.S. Provisional Patent Application Ser. No. 61/595,794 filed Feb. 7, 2012, and U.S. patent application Ser. No. 13/210,659 filed Aug. 16, 2011, now U.S. Pat. No. 8,887,660, which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

5) Isolate Piping Section—

When piping section to be isolated has been identified it can then be and isolated from the water source the piping section/system to be treated. Isolation may involve the use of bypass systems, use of control valves, pipe freezing or other techniques to permit isolation of the system or section to be worked on.

This step is further described in part, in the subject inventor's previous patent applications which include U.S. Provisional Patent Application Ser. No. 61/595,794 filed Feb. 7, 2012,U.S. patent application Ser. No. 13/210,659 filed Aug. 16, 2011, now U.S. Pat. No. 8,887,660, which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

6) Drain Piping Section/System

After the piping section has been isolated, the section can be drained of water. The compressor can be hooked up to at least one opening of the piping section and filtered pressurized air can be blown through the pipe which can assist in the draining process.

This step is further described in part, in the subject inventor's previous patent applications which include U.S. Provisional Patent Application Ser. No. 61/595,794 filed Feb. 7, 2012, U.S. patent application Ser. No. 13/210,659 filed Aug. 16, 2011, now U.S. Pat. No. 8,887,660, which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

7) Dry Piping Section/System

Prior to the cleaning/abrading application, the pipes shall be relatively dry and relatively free from standing water. This is achieved by drying the inside of the piping section/system with heated, filtered compressed air which flows through the pipe section/system.

This step is further described in part, in the subject inventor's previous patent applications which include U.S. Provisional Patent Application Ser. No. 61/595,794 filed Feb. 7, 2012, U.S. patent application Ser. No. 13/210,659 filed Aug. 16, 2011, now U.S. Pat. No. 8,887,660, which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

8) Clean and Abrade Piping Section/System

The cleaning process utilizes compressed air and selected abrasives being applied to the inside of the piping section/system. Attach the compressor to the sander which is connected to the open end of the piping section. At the exit end of the piping section, attach the vacuum collector. The choice of the abrasive, grit size and type, used in conjunction with the sander and compressed air are at the discretion of the contractor. Various abrasive types can be used depending on local supply. Pressurized air up to approximately 0.755 m$^3$/s (1600 CFM) and up to approximately 1379 kPa (200 PSI) into one end of the pipe for drying and cleaning the interior, generating a vacuum drawing air up to approximately 0.519 m$^3$/s (1100 CFM) in a second end of the pipe. During the process there are times the compressor can operate alone or the vacuum can operate alone or they can ideally operate simultaneously with each other.

This step is further described in part, in the subject inventor's previous patent applications which include U.S. Provisional Patent Application Ser. No. 61/595,794 filed Feb. 7, 2012, U.S. patent application Ser. No. 13/210,659 filed Aug. 16, 2011, now U.S. Pat. No. 8,887,660, which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

It is well known that lead used in fabrication of fixtures or with pipes can leach for a considerable period of time. More to the point of this invention is the in-place remediation of lead pipes whereby a specialized lining material can be placed inside a lead pipe or a pipe and fixtures that contain lead, reducing lead levels so lead leaching into the drinking water supply from the lead substrate will measure approximately 10 µg/L or less, reducing or eliminating the need to rely on expensive ongoing passivation or pipe replacement methods to meet the maximum 10 µg/L lead leaching cut off criteria.

In the presence of a lead substrate the invention uses a method of preparing the lead substrate that minimizes the removal of the effects of passivation of the lead that had taken place on the lead substrate wherein the lining material while being placed will pick up less free lead residuals. Pipes and fittings containing lead in their make-up that are prepared and lined by this invention will leach less than approximately 1 µg/L of lead without the need for ongoing passivation.

The invention uses a preferred method of preparing the lead substrate wherein the substrate is prepared in such a manner combined with the methods, apparatus and application of the coating materials reduces the need for the ongoing use of corrosion inhibitors such as phosphate-based materials and reduces the time for lead leaching to fall below the desired "steady state" of less than 10 µg/L. See TABLE 1

TABLE 1 describes the Lead Leaching Results for a substrate lead pipe having various surface preparation procedures for non-chlorinated water pipes. Testing was completed various conditions of lead substrate all pipes were exhumed in service samples, extracted in the UK. Specimen's tested included 1) White Metal-SSPC-SP 5 (NACE 1) Removal of all visible rust, mill scale, paint, and foreign matter by blast cleaning, untreated 2) Lead with inhibitor was an exhumed in service lead line that had been protected using a phosphate inhibitor, dried and coated 3) Near White Blast SSPC-SP 10 (NACE 2) Blast cleaning nearly to White metal cleanliness, until at least 95% of the surface area is free of all visible residues and coated 4) Brush-Off Blast Cleaning SSPC-SP 7 (NACE 4)—Blast cleaning of all except tightly adhering residues of mill scale, rust and coatings and coated. Cleaning standards referenced are SSPC, Society for Protective Coatings and NACE is National Association of Corrosion Engineers. The preferred method focused on Brush-Off Blast Cleaning SSPC-SP 7 (NACE 4) standards on lead substrate.

Leaching periods T1 through T3 are 3×72±1 hour leachates periods. Testing on preferred method completed June 2012 by LGC Ltd., Queens Road, Teddington, Middlesex, TW11 0LY, UK.t Analytical Sciences, Petaluma, Calif., USA, 94952 completed testing on alternative methods in March 2012

TABLE 1

Lead μg/L
Substrate Preparation to Lead Pipe

| Leaching<br>−72 hours<br>per period (T)<br>Non-chlorinated<br>water | White<br>Metal<br>Blast<br>No Coating | Lead<br>w/inhibitor<br>Lead<br>pipe<br>treated<br>with<br>orthophosphate-<br>based lead<br>inhibitor<br>No Coating | Near<br>white<br>Blast<br>With<br>Coating | Preferred<br>Method<br>Previous<br>adherent<br>coating<br>remains<br>after<br>brush off<br>standard<br>preparation<br>With Coating |
|---|---|---|---|---|
| T1 | 79,000 μg/L | 150 μg/L | 6.2 μg/L | .17 μg/L |
| T2 | 94,000 | 77 | 37.5 | <.10 |
| T3 | 99,000 | 140 | 88.7 | <.10 |

Additional leaching testing for lead was completed by LGC Ltd., on the preferred method using chlorinated water which showed lead levels at T1: <0.10 μg/L, T2: <0.10 μg/L and T3: 0.19 μg/L, all below 1 μg/L, the reporting cut off for British Standard BS 6920.

When lead substrate material is present and in particular when preparing the substrate of lead pipe, the preferred blast media may range from those having a sphere like shape, a low angular profile, a cubical profile, to those having a highly angular profile. Abrasive particulates that contain in their make up can include at least one of or any combination of: calcium, silica, garnet, alumina, silicone, sodium, sodium bicarbonate, glass, crushed nut casings, plastic, acrylic, urea, melamine, thermoplastic, bioplastic, polyamide, nylon, thermosetting polymer or cellulose.

The abrasive particulates can include those in the range of approximately 8 to approximately 600 US mesh, preferably in the range of 8 to 100 US mesh size and a hardness rating of less than approximately 9 Mohs, preferably less than 4 Mohs, and more preferably approximately 1 to approximately less than 4 Mohs can be selected.

Abrasives can be injected into the piping system, which if comprised of a lead substrate, with air pressures of approximately less than 413.685 kPa (60 PSI), preferably between approximately 34.47 kPa (5 PSI) and approximately 310.26 kPa (45 PSI). The lead substrate will not be scarified but peened and ideally portions of previously applied coatings/lead inhibitors that are loose will be removed in a brush off approach leaving adherent residuals on the substrate surface.

Abrasives can be injected into the piping system using compressed air, forced in at an opening of the piping system where the abrasive media will be directed over the interior pipe wall with angles of strike of less than 90°, preferably less than a 30° strike angle, when measured against the pipe wall, while spent abrasives and resulting debris are evacuated via forced compressed air at the entry of the system and a vacuum draw at the exit of the piping system.

During the process there are times the compressor can operate alone or the vacuum can operate alone, ideally they should operate simultaneously with each other for a selected time of at least several minutes. Pressurized air up to approximately 0.755 m³/s (1600 CFM) and up to approximately 1379 kPa (200 PSI) into one end of the pipe for drying and cleaning the interior, generating a vacuum drawing air up to approximately 0.519 m³/s (1100 CFM) in a second end of the pipe.

The spent abrasive and debris are captured in the vacuum/collector at the piping system exit. Part of the applicator procedure is to independently air flush the piping system to further remove any loose debris. Air flushing is a procedure where after the abrading process is complete, an independent flush of the piping system using "air only" is completed.

Abrading material can be used in a single pass run. The simultaneous use of the air filter vacuum at the exit end, drawing air to assist the compressor, reduces the negative effects of friction loss in the piping system, enhancing the effects of the sanding and debris removal. In the presence of lead pipe and fittings the vacuum assists in a more efficient means of evacuating lead dust and debris. An optional lead stabilizer/passivator can be applied during and/or at the conclusion of the cleaning process, prior to the lining process.

9) Heat Piping Section/System

The suggested minimum temperature of the substrate at the onset should not be less than approximately 3° C. (37° F.) Heating the piping section can be achieved by flowing heated filtered compressed air through the pipe section, heated water or steam heating also be used. Heated flowing air ideally in the range of 10° C. to 30° C. (50° F. to 86° F.) can be used. Higher temperatures beyond 30° C. (86° F.) can be used in the process. The air can be mechanically heated by a compressor or the use of in-line heaters that are electronically or gas fueled or such as the unit described in U.S. patent application Ser. No. 12/571,561, filed Oct. 1, 2009, now U.S. Pat. No. 8,399,813, which is a Continuation in Part of application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002.

Pipe substrate temperature readings can be taken by electronic or mechanical methods. Mechanical means can be a surface type contact thermometer, whereas electronic means can be by the use of a laser type temperature reading unit.

Temperature readings can be taken ideally where the air exits the piping system and the heat sources can be adjusted accordingly.

10) Prepare and Inject Lining Material

Estimate the amount of lining material required to coat the piping section. Mix quantity as required, ideally, mechanical mixers can be used. Induct mixed coating material for at least 1 minute and then inject mixed coating material into the piping system using heated substantially moisture free and substantially oil free filtered compressed air. Positive air pressure is used to inject the lining material. Depending on pipe ID and lengths and various other factors such as the coatings viscosity, pot life and application temperatures. For example, for pipes ranging in ID from 12 mm (½") to 50 mm (2") ID, injection pressures can range from about 20 PSI (137.90 kPa) to about 60 PSI (413.685 kPa)

Table 2 shows the estimated amount of mixed material required.

TABLE 2

ESTIMATED AMOUNT OF MIXED MATERIAL REQUIRED

Approx. Pipe Internal Dimension
(ID) with coating quantity expressed in mls

| Length (m) | 12 mm | 20 mm | 25 mm | 32 m | 38 mm | 50 mm |
|---|---|---|---|---|---|---|
| 3 | 100 mls | 100 mls | 200 mls | 200 mls | 200 mls | 300 mls |
| 6 | 150 | 150 | 300 | 300 | 400 | 500 |
| 9 | 200 | 300 | 400 | 500 | 600 | 700 |

If leaks are identified or are suspect and the approximate size determined, the operator can choose to apply the coating material without fillers, if the leak is determined to be approximately >30 mils in size, the operator can decide to add fillers to the coating material, prior to injection into the piping system. Fillers preferably made of the same material that comprises the barrier coating can be used. Other materials may also be used include: glass flakes, glass fibers, epoxy fibers, mica, clay, silica, cork, plastics, acrylic, urea, melamine, thermoplastic, bioplastic, polyamide, nylon, thermosetting polymer or cellulose.

Such fillers and materials are are described in pending U.S. patent application Ser. No. 12/813,873 filed Jun. 11, 2010, now U.S. Pat. No. 8,343,579, to the same assignee as the subject invention, which is a Divisional of U.S. patent application Ser. No. 12/723,115, now U.S. Pat. No. 8,033, 242, which is a Divisional of U.S. patent application Ser. No. 11/649,647 filed Jan. 4, 2007, now U.S. Pat. No. 7,858,149 which is a Continuation-In-Part of U.S. patent application Ser. No. 11/246,825 filed Oct. 7, 2005, now issued as U.S. Pat. No. 7,517,409, which is a Divisional of U.S. patent application Ser. No. 10/649,288 filed Aug. 27, 2003, now issued as U.S. Pat. No. 7,160,574 and which claims the benefit of priority to U.S. Provisional patent application Ser. No. 60/406,602, filed Aug. 28, 2002, all of which are incorporated by reference.

The coating and material can be mixed and metered to required amounts as per manufacturer's specifications using a mixer. The barrier coating and fillers are placed into coating carrying/induction tube and inducted as part of the mixing and curing process prior to application. The induction step assists the resin and hardener to better compatibilize before injection and placement into the piping system.

The coating with or without fillers as determined can be injected into the piping system using heated, pre-filtered, substantially moisture and substantially oil free compressed air at temperatures, air volumes and positive pressure levels to distribute the barrier coating throughout the areas to be coated, in sufficient amounts, to reduce the water to pipe/substrate contact in order to create a barrier coating which reduces water to metal contact on the inside of the pipe or fitting and if leaks are present, seal the leak in a single operation.

The temperature of the air flow ideally will range from approximately 10° C. to approximately 30° C. (50° F. to 86° F.) but can be greater. During this placement or wetting out stage, a vacuum filter can be used in conjunction with the compressor to assist the wetting out of the coating material. During this wetting out period a positive pressure and airflow in the piping system must be maintained on the inside of the pipe. Ideally a positive air pressure of at least approximately 1.5 PSI (10.34 kPa) should be applied while the coating material is being placed. The coating can be applied to achieve a minimum average coating thickness of at least approximately 100 microns (4 mils) and can seal leaks up to approximately 125 mils in size.

11) Coating Pipe Lengths and Diameters—

Pipe lengths and corresponding diameters that can be coated (lengths expressed in meters) given here as a guide in Table 3, assumes a unidirectional application with no additional entry points. Multi directional application can be required on longer lengths. Internal pipe diameters that can be coated are from at least approximately 12 mm (½") ID (interior diameter) in size.

TABLE 3

Pipe Diameter and Single Sectional Length Guide

| Internal Pipe Diameter | Unidirectional Application | Approximate Maximum Single Sectional Length |
|---|---|---|
| 12-15 mm | Yes | 20 meters |
| 20-25 mm | Yes | 30 meters |
| 32-50 mm | Yes | 35 meters |

12) Cure Lined Pipe—Cure Step 1—Air Curing Stage:

Once the coating material is placed in the piping system, heated, substantially moisture free and substantially oil free filtered, compressed air is applied to create a neutral or positive pressure, ideally a positive pressure of at least approximately 1.5 PSI (10.34 kPa) should be applied over the internal surface of the pipe and throughout any in-line fittings and valves to set the barrier coating for a selected period of time of at least several minutes, wherein the coating can remain in at least it's A-Stage of cure prior to the water or steam cure stage is achieved.

The temperature of the air flow ideally will range from approximately 10° C. to approximately 30° C. (50° F. to 86° F.) but can be greater. If ambient air temperatures can be maintained at approximately no less than approximately 10° C., (50° F.) then the mechanically heated air flows may be eliminated at this stage of the process.

Cure Step 2—Water or Steam Curing Stage:

After the air curing stage is completed, a water or steam cure stage can be added by passing water or steam or a combination thereof through the lined pipe until the lining has achieved its final cure. If heated water, (above approximately 25° C. (77° F.)) is used in the water curing process, the addition of a degassing water filter apparatus can be used to reduce fixed gasses from the heated water. The degassing filter can reduce fixed gasses in the source water. The reduction of fixed gasses in the source water, being used in the curing process, will reduce the amount and effects of air being released from the heated water. Depending on the degree of cure of the placed lining material at the time of the release of fixed gasses, the lesser amount of fixed gas being released from the water lessens the likelihood of surface imperfections such as pin holing occurring in the uncured coating especially when the coating is at its A stage of cure. Fixed gas content of the cure water which can include: oxygen, nitrogen, carbon dioxide, hydrogen, ethane, ethane, acetylene, propane and carbon monoxide should be less than 40,000 parts per million per volume (ppmv) and ideally less than 25,000 ppmv when tested according to ASTM Method 1946 D.

Water used in the water cure stage can contain sediments or other foreign matter which when in contact with degassing filters or apparatus or in contact with uncured coating can, depending on size and amount, create potential clogging or contamination and should be reduced.

Ideally, sediment filters used to clean the water used in the curing process shall be capable of reducing sediments to at least an approximate 5 microns in size.

The barrier coating can be cured in a period of at least approximately 1 hour to approximately 4 hours. Filters can be obtained from GE Appliances, Louisville Ky., 40225.

13) Post Cure Inspection

After completion of cure, the lined pipe shall be visually inspected for cure and quality. The desired minimum average thickness of the coating inside the pipe will be of no less than approximately 100 microns (4 mils) with full 360° covergage. A final water flow rate check can be conducted. A water flow check can be measured with a calibrated vessel or a water flow meter.

14) Disinfection, Flushing and Waste Water

Prior to reinstatement, the coated pipe and fittings can be disinfected in accordance with local water supplier guidelines. In the event the water supplier has no disinfection procedures, an optional minimum of approximately 5 minutes of a fresh water flush may be completed. Local main water supplies can be used.

15) Conduct Post Coating Water Analysis

The water test can be conducted to determine the effectiveness of the coating over suspect substrate materials that may have been in the piping system. Ideally specific metals testing can be conducted first on site and if additional testing is required then established sampling protocols can be followed for on-site collection and analysis.

FIGS. 2A, 2B, 2C and 2D show a detailed process flowchart using the steps of FIG. 1 for providing the barrier coating leak sealant. These flow chart figures show a preferred method of applying a novel barrier coating leak sealant for the interior of small diameter piping systems following a specific breakdown of a preferred application of the invention.

FIGS. 2A-2D are further described in detail in reference to parent patent applications U.S. patent application Ser. No. 13/210,659 filed Aug. 16, 2011, now U.S. Pat. No. 8,887,660, which is a Divisional application of U.S. patent application Ser. No. 12/378,670 filed Feb. 18, 2009, now U.S. Pat. No. 8,206,783, which is a Divisional application of U.S. patent application Ser. No. 11/246,825 filed Oct. 7, 2005, now U.S. Pat. No. 7,517,409, which is a Divisional application of U.S. patent application Ser. No. 10/649,288 filed Aug. 27, 2003, now U.S. Pat. No. 7,160,574, and which claims the benefit of priority to U.S. Provisional Patent Application Ser. No. 60/406,602, filed Aug. 28, 2002, all of which are incorporated by reference.

Components in FIG. 3 will now be identified as follows:

| IDENTIFIER | EQUIPMENT |
| --- | --- |
| 100 | Compressed, Air Supply Outfitted with Aftercooler, Water separator, Fine Filter and Reheater, (if reheater is required) |
| 200 | Manifold with or without internal heater |
| 300 | Sander |
| 400 | Air Filter Vacuum |
| 500 | Coating Metering and Dispensing Unit |
| 600 | Water/Steam Generator with optional sediment and degassing water filters depending on water source, fixed gas content of the source water and water temperature |
| 700 | Barrier Coating and Sealant |
| 800 | Carrying/Induction Tube |

Referring to FIG. 3, components 100-800 can be located and used at different locations. The invention allows for an entire isolated piping system to be cleaned in one single pass through run without having to dismantle either the entire or multiple sections of the piping system including no complete dismantling of the pipe and in-line pipe connectors.

The piping system can include pipes having interior diameters of at least approximately 12 mm with the piping including bends up to approximately ninety degrees or more. The invention allows for an entire piping section to have the interior surfaces of the pipes coated and if present, leaks sealed in one single pass through run without having to dismantle either the entire or multiple parts of the piping system. Coating of the internal wall surface of in-line fittings and valves as well as exposed pipe ends located inside valves and inside in-line fitting/connectors can be accomplished in the same single pass operation. Each of the components will now be defined.

100 Air Generator

The air generator 100 can be outfitted to provide filtered and heated compressed air. The filtered and heated compressed air employed in various quantities is used to dry the interior of the piping system, used as the propellant to drive the abrasive material used in cleaning of the piping system and is used as the propellant in the application of the barrier coating and the drying of the barrier coating once it has been applied. The air generator 100 also provides compressed air used to propel ancillary air driven equipment. Air pressures and flow will be widely dependent on the size and scope of the piping system to be restored. Pressurized air up to approximately 0.755 m$^3$/s (1600 CFM) and up to approximately 1379 kPa (200 PSI) can be used.

200 Air Distribution Manifold

A custom built air distribution manifold 200 can be one Manufactured By: Media Blast & Abrasives, Inc. 591 W. Apollo Street Brea, Calif., USA, 92821.

As part of the general air distribution system set up, the air manifold 200 can be a pressure rated vessel designed to distribute the compressed air to at least 2 other points of connection, typically being the connections to the piping system. Airflow from each connection at the air distribution manifold is controlled by the use of individual valves.

There are many novel parts and benefits to the air distribution manifold 200. The portability of the air distribution manifold 200 allows for easy to move and maneuver in tight working environments. The design provides a stable base for the air distribution manifold 200 as well as keep the hose end connections off the floor or ground with sufficient clearance to permit the operator ease of access when having to make the hose end connections.

The air distribution manifolds 200 can be modular and can be used as 1 unit or can be attached to other units and used as more than 1. Regulator adjustment can easily and quickly manage air capacities ranging to approximately 0.755 m$^3$/s (1600 CFM) and up to approximately 1379 kPa (200 PSI) can be used, and vary the operating airflows to each of the other ancillary equipment associated with the invention. An air pressure regulator can be attached to the air distribution manifold 200 which allows the operator to manage both regulated and unregulated air management. An in-line electrical or gas type heater can be incorporated into or as part of the air distribution manifold 200 set up with a temperature regulator that will allow the operator access to heated air and temperature control.

300 Sander

A sander 300 that can be used with the invention can be one Manufactured By: Media Blast & Abrasives, Inc. 591 W. Apollo Street Brea, Calif. 92821.

The sander system 300 can provide easy loading and controlled dispensing of a wide variety of abrasive media. The sander can include operational controls that allow the operator to easily control the amount of air pressure and control the quantity of the abrasive media to be dispersed in a single or multiple applications. The abrasive media can be controlled in quantity and type and is introduced into a moving air steam that is connected to a pipe or piping systems that are to be blasted clean by the abrasive media.

The abrasive media can be introduced by the sander 300 by being connected to and be located outside of the piping system depicted in FIG. 3. The novel application of the sander system 300 allows for cleaning small diameter pipes having internal diameters of at least approximately ±12 mm (½") to ±50 mm (2") and larger.

There are many novel parts and benefits to the use of the sander 300. The portability allows for easy to move and maneuver in tight working environments. The sander 300 is able to accept a wide variety of abrasive media in a wide variety of media size. Variable air pressure controls allows for management of air pressures up to approximately 861.85 kPa (125 PSI.) A mixing valve adjustment allows for setting, controlling and dispensing a wide variety of abrasive media in limited and controlled quantities, allowing the operator control over the amount of abrasive medium that can be introduced into the air stream in a single or multiple applications. All operator controls and hose connections can be centralized for ease of operator use.

400 Air Filter Vacuum

An example of an air filter vacuum 400 used with the invention can be one Manufactured By: Media Blast & Abrasives, Inc. 591 W. Apollo Street, Brea, Calif. 92821.

During the pipe profiling stage, the air filter vacuum 400 is the final stage of the debris capturing and air filtration process. The air filter vacuum 400 filters the passing air of fine dust and debris from the piping system.

During the drying stage the air filter vacuum 400 can be used simultaneously with the air supply 100 and aids in drawing air through the piping system. During the sanding or cleaning stage the air filter vacuum 400 can be used with the air supply 100, the air filter vacuum 400 assists by drawing air through the piping system. The air filter vacuum 400 when used simultaneously with the air supply 100 creates a pressure differential in the piping system which is used to reduce the effects of friction loss within the pipe during the drying and sanding or cleaning stages as well as the coating stage. The air filter vacuum 400 can also be used without the air supply 100 and can be used in connection with air distribution manifold, where the air filter vacuum 400 draws or blows heated air from the air distribution manifold 200 permitting heated air to flow through the pipe assisting in various drying and heating stages while not relying on the use of the air supply 100. The air filter vacuum 400 can also be used as an air blower.

500 Portable Thermoset Metering and Dispensing Unit

A metering and dispensing unit 500 used with the invention can be one Distributed by: Sulzer MixPac, UK, Henson Way, Kettering, Northants, NN168PX, UK.

Metering can be conducted using prefilled cartridges which are identified with a dispenser guide showing graduations of the amount of material which can be dispensed from the cartridge. Dispensing equipment is capable of dispensing the Base and Activator components within ±5% of the specified mix ratio. The dispenser is fitted with a static type mixer having internal mixer elements.

Other than dispensing, no operator mixing is required with use of the prefilled ratio controlled cartridges/mixers. Cartridges are able to dispense varying amounts of Base and Activator components depending on operator selection ideally no less than approximately 25 ml mixed per single application (shot size) and up to approximately 1.5 liters, mixed, (shot size) per single application.

The applicator device can include a dual cartridge pneumatic manual applicator that is a hand-held, manually operated meter-mix dispenser. These dispensers provide a convenient, cost-effective method to apply product with minimal waste. The dispensers are compatible with multi mix ratio products. Maximum inlet pressure of approximately 600 kPa (90 PSI), maximum compressor air supply approximately 800 kPa (120 PSI). Pressure adjustment, infinitely variable, sound level approximately 82 dBA. Other types of metering and mixing units can be used.

600 Hot Water or Steam Generator

A portable hot water generator or steam generator can be comprised of a heating element, a storage tank, a thermostat, re-circulating pump, on-off valves, directional and pressure relief valves, water sediment filters and water degassing filter system. Off the shelf hot water heaters can be obtained from Kamco Ltd, Hertfordshire, UK, AL2 2DD, filters can be obtained from GE Appliances, Louisville, Ky., USA 40225

700 Barrier Coating

A preferred barrier coating that can be used with the invention can be one manufactured by: CJH, Inc. 2211 Navy Drive, Stockton, Calif. 95206. The barrier coating product used in this process can be a 2-part thermoset resin with a base resin and a base-curing agent in which the curing agent incorporates the use of amine adducts where the adducts are phenol free and plasticizer free.

Table 4 shows the formula and range formula for a preferred barrier coating.

TABLE 4

| Raw material | Percentage (actual) Wt. | Percentage (actual) Vol. | Range formula by weight |
|---|---|---|---|
| Resin epoxy | 63% | (67%) | 40-80% |
| Curing Agent- Amine adduct, Adduct is phenol free and plasticizer free, | 22% | (28%) | 5-45% |
| Thixotrope | 1.5% | (1%) | 0-5% |
| Primary Coloring Pigment | 9% | (2%) | 0-20% |
| Fillers Organic/inorganic | 4.5% | (2%) | 0-60% |

Examples of inorganic pigments can include but are not limited to pigments selected from the group of titanium dioxide, carbon black, iron oxides, cadmium sulphides, zinc chromates, chromium oxides and azurite.

Examples of organic pigments can include but are not limited to pigments selected from the group of alizarin, anthoxanthin, arylide yellow, azo compound, bilin, bistre, bone char, caput mortuum, carmine, crimson, dragon's blood, gamboge, hansa yellow, indian yellow, indigo dye, naphthol red, ommochrome, phthalocanine blue BN, phthalocyanine green G, quinacridone, rose madder, rylene dye, sepia, tyrian purple.

Examples of inorganic fillers can include but are not limited to fillers selected from the group of aluminum silicate, calcium carbonate, magnesium silicate, ceramic zircon, metal powders, clay, silica, zirconium silicate, talc, mica, wollastonite, hydrated alumina.

Examples of inorganic fillers can include but are not limited to fillers selected from the group of both thermoset and thermoplastics which can include epoxy, polyurethane, acrylics, urea, melamine, bioplastic, polyamide, nylon.

Organic and inorganic fillers can be used alone or in combinations.

Test Conditions and Results

Leaching and analytical works were conducted at and verified by LGC Ltd., Queens Road, Teddington, Middlesex, TW11 0LY, UK. Testing was done in September 2011.

Six lengths of 15 mm ID pipe were laid out and connected to the resin application system via flexible piping. Heated compressed air was then applied to the pipes to warm them to approximately 20° C. A two part resin was preheated to ≥approximately 35° C., mixed and inducted before injecting the mixed coating material into the pipes. The mixed resin was then applied to the copper pipe using heated compressed air. Once the resin was visible in the clear plastic pipe connected to the end of the pipe it was considered coated and the procedure repeated for the next pipe.

Once all the pipes had been coated, they were air cured by passing heated compressed air through at a temperature of approximately 20° C. for approximately 1 hour. Air temperatures were recorded using an infrared thermometer at the pipe exit. Once the air curing stage was completed the pipes were interconnected using plastic piping and then water cured by passing heated water through at a temperature of approximately 55° C. for approximately 1 hour.

Once the curing stages were completed the pipes were visually inspected for cure and quality. A final 5 minute flush was then carried out using a local mains water. The pipes were then taken to the laboratory to immediately commence leaching tests. The entire process was then repeated using another set of six pipes.

Two different sets (SET 1 and SET 2) will now be described.

SET 1
Resin Mix temperature: 38° C.
Pipe Temperature before addition of mixed resin: 21° C.
Air cure time start: 09:32 Jan. 9, 2011
Air cure time end: 10:32 Jan. 9, 2011
Average pipe cure temperature: 19.4° C.
Water cure time start: 10:45 Jan. 9, 2011
Water cure time end: 11:45 Jan. 9, 2011
Water cure temperature: 55.6° C.
Flush time start: 11:55 Jan. 9, 2011
Flush time end: 12:00 Jan. 9, 2011
SET 2
Resin mix temperature: 36° C.
Pipe temperature before addition of mixed resin: 24.2° C.
Air cure time start: 12:45 Jan. 9, 2011
Air cure time end: 13:45 Jan. 9, 2011
Average pipe cure temperature: 20.3° C.
Water cure time start: 13:55 Jan. 9, 2011
Water cure time end: 14:55 Jan. 9, 2011
Water cure temperature: 55.0° C.
Flush time start: 15:10 Jan. 9, 2011
Flush time end: 15:15 Jan. 9, 2011

The preparation of three, 72 hour (T1, T2 and T3) leachates in both non-chlorinated and chlorinated test water was conducted in accordance with BS EN 12873-2:2005). All leachates were analysed for TOC, Bisphenol A, and Epichlorohydrin.

The preparation of non-chlorinated and chlorinated leachate and blank samples and their analysis was conducted in accordance with the requirements of UK's Drinking Water Inspectorate (DWI) Regulation 31 for Specific Deteminands tested according to BS EN 12873-2:2005.

TOC—Following blank subtraction the leachate samples had a TOC range of (less than) <0.10-0.36 mg/L. The blank samples had a TOC range of (less than) <0.10-0.10 mg/L.

Bispehnol A—Following blank subtraction the leachate samples had a Bisphenol A range of 0.3-0.5 µg/L. All blank samples had a Bisphenol A concentration of (less than) <0.2 µg/L.

Epicholorhydrin—All leachate and blank samples had an Epichlorohydrin concentration of (less than) <0.2 µg/L.

Samples were analysed using a GC-MS method which was validated specifically for this project. The estimated limit of detection is <0.2 µg/L for Bisphenol A and Epichlorohydrin and a value at this is level would be equivalent to the 0.2 µg/ml solvent calibration standard.

Actual Tested SA:Vol $dm^{-1}$

Non-Chlorinated Samples: 31.90, Chlorinated Samples: 31.75

Note: 12 mm Interior Diameter Pipe: 33.33

Table 5 shows the TOC results for non-chlorinated samples and chlorinated samples.

TABLE 5

TOC Results TOC mg/L

| Leaching Period T = ±72 hrs | Non-Chlorinated Samples | Chlorinated Samples |
| --- | --- | --- |
| T1 | <0.10 | 0.36 |
| T2 | <0.10 | 0.29 |
| T3 | <0.10 | 0.24 |

Table 6 shows the Bisphenol A Results for non-chlorinated samples and chlorinated samples.

TABLE 6

Bisphenol A Results A µg/L

| Leaching Period T = ±72 hrs | Non-Chlorinated Samples | Chlorinated Samples |
| --- | --- | --- |
| T1 | <0.2 | 0.5 |
| T2 | <0.2 | 0.4 |
| T3 | <0.2 | 0.3 |

Table 7 shows the Epichlorohydrin Results for non-chlorinated samples and chlorinated samples.

TABLE 7

Epichlorohydrin Results µg/L

| Leaching Period T = ±72 hrs | Non-Chlorinated Samples | Chlorinated Samples |
| --- | --- | --- |
| T1 | <0.2 | <0.2 |
| T2 | <0.2 | <0.2 |
| T3 | <0.2 | <0.2 |

The preferred thermoset resin is mixed as a two-part product that is used in the invention. When mixed and applied, it forms a durable barrier coating on pipe and fittings interior surfaces and other substrates. The barrier coating provides a barrier coating that protects those coated surfaces from the effects caused by the corrosive activities associated with the chemistry of water and other reactive materials on the metal and other substrates and seal leaks in the pipe or fittings. Once applied and cured the preferred coating shall have a pull test adhesion against the prepared substrate of at least 2758 kPa (400 PSI) or substrate failure.

The barrier coating and methods described can be applied to create a protective barrier coating and leak sealant to pipes and fittings having an internal diameter of at least approximately 12 mm (½"). The barrier coating can be applied around bends, intersections, elbows, t's, to pipes having different diameters and make up.

The barrier coating can be applied to pipes in any position e.g.: vertical or horizontal, and can be applied as a protective coating to metal and plastic type pipes used in contact with potable water, as well as fire sprinkler systems, natural gas systems, heating and cooling pipes. At least an average of approximately 100 micron (4 mils) coating layer can be formed on the interior walls of the pipes.

The barrier coating protects the existing interior walls and can also stop leaks in existing pipes and fittings which have small openings and cracks, and the like, of up to approximately 125 mils in size. Although the process of application described in this invention includes application of a specific thermoset resin, other types of thermoset resins such as but not limited to bis-maleimids (BMI), epoxy (epoxide), phenolic (PF), polyester (UP), polyimide, polyurethane (PUR) and silicone can be used.

For example, other thermoset resins can be applied in the process, and can vary depending upon viscosity, conditions for application including temperature, diameter of pipe, length of pipe, type of material pipe comprised of, application conditions, potable and non-potable water carrying pipes, natural gas pipes, heating system pipes and based on other conditions and parameters of the piping system being cleaned, coated and leaks sealed by the invention.

Other thermoset type resins that can be used include but are not limited to and can be one of many that can be obtained by suppliers such as but not limited to: Dow Chemical, Hexion Chemicals, Aditya Birla Chemicals and Air Products.

A preferred viscosity range of the mixed as-applied barrier coating used in this process, before additional on-site fillers are introduced, when measured at room temperature, wherein room temperature is described as being ±25° C. (±77° F.), is in the range of approximately 1.2 to approximately 60 Pa-s (1,200 centipoise (cps) to approximately 60,000 centipoise (cps)), and preferably in a narrow range of 5 to 35 Pa-s (5,000 cps to 35,000 cps).

The pot life, measured at room temperature wherein room temperature is described as being ±25° C. (±77° F.), is preferably at least approximately 15 minutes. A preferred range of pot life would be from approximately 15 to approximately 45 minutes.

Additional fillers used in the process preferably can contain a mixture of low and high aspect ratio particles, acicular shaped particles and other plate like particles.

Fillers preferably made of the same material that comprises the barrier coating can be used. Other materials may also be used include: glass flakes, glass fibers, epoxy fibers, mica, clay, silica, cork, plastics, acrylic, urea, melamine, thermoplastic, bio plastic, polyamide, nylon, thermosetting polymer or cellulose.

The amines used according to this invention can include aliphatic, cycloaliphatic or araliphatic amines like: 1,2-diaminoethane (ethylenediamine (EDA)); 1,2-propanediamine; 1,3-propanediamine; 1,4-diaminobutane; 2,2-dimethyl-1,3-propanediamine (neopentanediamine); diethylaminopropylamine (DEAPA); 2-methyl-1,5-diaminopentane; 1,3-diaminopentane; 2,2,4-Trimethyl-1,6-diaminohexane; 2,4,4-Trimethyl-1,6-diaminohexane and mixtures thereof (TMD); 1-amino-3-aminomethyl-3,5,5-trimethylcyclohexane; 1,3-bis(aminomethyl)-cyclohexane; 1,2-bis(aminomethyl)cyclohexane; hexamethylenediamine (HMD); 1,2- and 1,4-Diaminocyclohexane (1,2-DACH and 1,4-DACH); bis(4-aminocyclohexyl)methane; bis(4-amino-3-methylcyclohexyl)methane; diethylenetriamine (DETA); 4-azaheptane-1,7-diamine; 1,11-diamino-3,6,9-trioxundecane; 1,8-diamino-3,6-dioxaoctane; 1,5-diamino-methyl-3-azapentane; 1,10-diamino-4,7-dioxadecane; Bis(3-aminopropyl)amine; 1,13-diamino-4, 7-10 trioxamidecane; 4-aminomethyl-1,8-diaminooctane; 2-butyl-2-ethyl-1,5-diaminopentane; N,N-Bis-(3-aminopropyl)methylamine; triethylenetetramine (TETA); tetraethylenepentamine (TEPA); pentaethylenehexamine (PEHA); Bis(4-amino-3-methylcyclohexyl)methane; m-xylylenediamine (MXDA); 5-(aminomethyl)bicyclo[[2.2.1]hept-2-yl]methylamine (NBDA norbornanediamine); dimethyldipropylenetriamine; dimethylaminopropyl-aminopropylamine (DMAPAPA); 3-aminomethyl-3,5,5-trimethylcyclohexylamine (or isophoronediamine (IPD)); diaminodicyclohexylmethane (PACM); mixed polycyclic amines (MPGA) (e.g. Ancamine 2168); dimethyldiaminodicyclohexylmethane (Laromin C260); 2,2-Bis(4-aminocyclohexyl)propane; bis aminomethyl-dicyclopentadiene (tricyclodecyldiamine (TCD)); imidazoline-group-containing polyaminoamides derived from aliphatic polyethylene polyamines and dimerized or trimerized fatty acids and adducts thereof made from glycidyl compounds.

800 Carrying/Induction Tube

The mixed barrier coating can be placed into a carrying tube/induction tube prior to injection into the piping system. A suitable induction tube may be constructed of a food grade rated material such as a vinyl flexible hose or tubing with connector ends enabling the induction tube to be connected on one end to the incoming air supply and at the other end (induction tube exit) to be connected either to the piping system or to an additional extension tube connected to the piping system.

Although the novel invention can be applied to all types of metal pipes such as but not limited to lead pipes, brass pipes, copper pipes, steel pipes, galvanized pipes, and cast iron pipes, the invention can be applied to pipes made of other materials such as but not limited to plastics, PVC (polyvinyl chloride), composite materials, polybutidylene, and the like. Additionally, small cracks and holes in plastic type and metal pipes can also be fixed in place by the barrier coating leak sealant. Lead leaching from the coated lead substrate will be reduced to less than approximately 10 µg/L (10 ppb) preferably less than 1 µg/L (1 ppb) when tested over a ±72 hour leaching period.

Although the preferred applications for the invention are described with supply pipe and building piping systems, the invention can have other applications such as but not limited to include piping systems for swimming pools, underground pipes, in-slab piping systems, piping under driveways, various liquid transmission lines, tubes contained in heating and cooling units, tubing in radiators, radiant in floor heaters, chillers and heat exchange units, natural gas lines and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for applying a protective barrier coating to interior surfaces of underground pipes that are exposed to lead, comprising the steps of:
    isolating an underground pipe section from the underground pipes that are exposed to lead;
    coating interior surfaces of the underground pipe section with a barrier coating in one pass; and
    curing the barrier coating in the underground pipe section, wherein lead levels leaching from the barrier-coated underground pipe section is less than 10 µg/L (10 ppb), wherein the barrier-coated underground pipe section is cured and ready to be returned to service in less than approximately 24 hours.

2. The method of claim 1, further comprising the step of:
    providing the underground pipes are exposed to lead by lead pipes.

3. The method of claim 1, further comprising the step of:
    providing the underground pipes are exposed to lead by lead solder.

4. The method of claim 1, wherein leachates, Bisphenol A and Epichlorohydrin leaching from the barrier coating to be less than approximately 1 µg/L (1 ppb).

5. The method of claim 1, wherein the overall TOC levels leaching from the barrier coating measured is less than approximately 2.5 mg/L (2.5 ppm).

6. The method of claim 1, further comprising the step of:
    cleaning the inside surfaces of the underground pipe section with a blasting media of particulates, the particulates being selected from at least one of: calcium, silica, garnet, alumina, silicone, sodium, plastics, acrylic, urea, melamine, bio plastic, polyamide, nylon, or cellulose.

7. The method of claim 1, further comprising the steps of:
    providing a 2-part thermoset coating composition, comprising a base resin and a curing agent as the barrier coating, wherein the base-curing agent comprises a phenol-free and plasticizer-free amine adduct.

8. The method of claim 7, further comprising the steps of:
    providing approximately 40 to approximately 80% resin epoxy as the base resin; and
    providing approximately 10 to approximately 45% polyamine adduct as the curing agent.

9. A method for applying a protective barrier coating to inside surfaces of underground pipes that are exposed to lead, comprising the steps of:
    isolating an underground pipe section from the underground pipes that are exposed to lead;
    cleaning inside surfaces of the underground pipe section;
    coating the inside surfaces of the underground pipe section with a barrier leak sealant, wherein the inside surfaces of the underground pipe section are lined and sealed, in-place in one pass; and
    curing the coated barrier leak sealant inside surfaces of the underground pipe sections, wherein heavy metal levels leaching from the coated barrier leak sealant are less than approximately 10 µg/L (10 ppb).

10. The method of claim 9, further comprising the step of:
    providing the underground pipes are exposed to lead by lead pipes.

11. The method of claim 9, further comprising the step of:
    providing the underground pipes are exposed to lead by lead solder.

12. The method of claim 11, further comprising:
    providing a 2-part thermoset coating composition, comprising a base resin and a base-curing agent as the barrier leak sealant, wherein the base-curing agent comprises a phenol-free and plasticizer-free amine adducts.

13. The method of claim 12, further comprising the steps of:
    providing approximately 40 to approximately 80% resin epoxy as the base resin; and
    providing approximately 10 to approximately 45% polyamine adduct as the curing agent.

14. The method of claim 9, further comprising the step of:
    providing a thermoset resin coating as the barrier leak sealant.

15. The method of claim 14, further comprising the step of:
    adding a phenol free and plasticizer free amine adduct in the thermoset resin coating.

16. The method of claim 14, wherein lead levels leaching into water from the coated barrier leak sealant inside surfaces of the underground pipe section is less than 10 µg/L (10 ppb).

17. The method of claim 14, wherein leachates, Bisphenol A and Epichlorohydrin leaching from the coated barrier leak sealant surfaces is less than approximately 1 µg/L (1 ppb).

18. The method of claim 14, wherein the overall TOC levels leaching from the coated barrier leak sealant surfaces is less than approximately 2.5 mg/L (2.5 ppm).

19. The method of claim 14, further comprising:
    providing, as the barrier leak sealant, a two-part thermoset resin coating having hydrophobic qualities that permit the coating to be cured in place by an air curing period; and
    curing the coated barrier leak sealant with at least one of an air curing period, a water curing period, a steam curing period, or a combination thereof, without need for a membrane barrier between the water or steam and the coating material.

20. The method of claim 9, further comprising the step of:
    providing the underground pipes have an interior diameter of at least approximately 12 mm.

* * * * *